United States Patent
Ristock et al.

(10) Patent No.: US 10,101,974 B2
(45) Date of Patent: Oct. 16, 2018

(54) CONTACT CENTER APPLICATION CREATING USING REUSABLE PROGRAM MODULES

(71) Applicant: Angel.com Incorporated, Vienna, VA (US)

(72) Inventors: Herbert Ristock, Daly City, CA (US); Petr Makagon, Daly City, CA (US); Josh Mahowald, Daly City, CA (US); Praphul Kumar, Falls Church, VA (US)

(*) Notice: Subject to any disclaimer, the term of this patent is extended or adjusted under 35 U.S.C. 154(b) by 0 days.

(21) Appl. No.: 14/448,759

(22) Filed: Jul. 31, 2014

(65) Prior Publication Data

US 2016/0034260 A1 Feb. 4, 2016

(51) Int. Cl.
*G06F 9/44* (2018.01)
*G06F 8/34* (2018.01)
*G06F 9/451* (2018.01)
*G06F 8/36* (2018.01)

(52) U.S. Cl.
CPC .............. *G06F 8/34* (2013.01); *G06F 8/36* (2013.01); *G06F 9/4446* (2013.01); *G06F 9/453* (2018.02)

(58) Field of Classification Search
None
See application file for complete search history.

(56) References Cited

U.S. PATENT DOCUMENTS

| 6,014,647 A * | 1/2000 | Nizzari ................ G06Q 20/10 |
| | | 705/39 |
| 6,721,726 B1 * | 4/2004 | Swaminathan ... G06F 17/30545 |
| 7,631,299 B2 * | 12/2009 | Kannenberg ............ G06F 8/70 |
| | | 705/4 |

(Continued)

FOREIGN PATENT DOCUMENTS

WO 2011133824 A1 10/2011

OTHER PUBLICATIONS

Book Title: Planning and Architectural Design of Integrated Services Digital Networks, Author: Nejat Ince, et al. 1995.*

(Continued)

*Primary Examiner* — Wei Zhen
*Assistant Examiner* — Hossain Morshed

(57) ABSTRACT

An application development platform transmits to a content provider system instructions that provide a user interface for developing an application that specifies a first multi-step communication flow between a communications device and a communications system. The platform receives from parameters of a program functionality for inclusion in the application, and selects one or more recommended program modules based on the parameters. The platform transmits instructions that provide a user interface for displaying the one or more recommended program modules. The platform receives data indicating a user selection of a particular program module. In response, the platform transmits instructions that provide a user interface for enabling user configuration of the particular program module. The platform (Continued)

receives modified parameters of the particular program module and determines a second multi-step communication flow between the communications device and the communications system based on the first multi-step communication flow and the modified parameters.

20 Claims, 29 Drawing Sheets

(56) References Cited

U.S. PATENT DOCUMENTS

| | | | | |
|---|---|---|---|---|
| 7,869,425 | B2* | 1/2011 | Elliott | H04L 12/14 370/352 |
| 7,941,798 | B2* | 5/2011 | Taylor | G06F 8/71 717/170 |
| 8,046,201 | B1* | 10/2011 | Pike | G06F 9/451 703/6 |
| 8,095,911 | B2* | 1/2012 | Ronen | G06F 8/36 717/120 |
| 8,549,433 | B2* | 10/2013 | Sathish et al. | 715/835 |
| 8,588,765 | B1* | 11/2013 | Harrison | G16H 10/60 455/424 |
| 8,954,102 | B2* | 2/2015 | Hewes | H04W 4/12 379/88.11 |
| 2004/0064351 | A1* | 4/2004 | Mikurak | G06Q 10/087 705/22 |
| 2006/0149571 | A1 | 7/2006 | Birch et al. | |
| 2006/0150148 | A1* | 7/2006 | Beckett | G06F 8/34 717/109 |
| 2007/0250841 | A1 | 10/2007 | Scahill et al. | |
| 2008/0215377 | A1* | 9/2008 | Wottowa | G06Q 40/00 705/4 |
| 2008/0313090 | A1* | 12/2008 | Portman | G06Q 10/06 705/80 |
| 2011/0178831 | A1* | 7/2011 | Ravichandran | G06Q 10/06 705/7.11 |
| 2011/0224828 | A1* | 9/2011 | Breznak | B25J 9/08 700/264 |
| 2014/0024350 | A1 | 1/2014 | Bouzid et al. | |
| 2014/0038578 | A1 | 2/2014 | Bouzid et al. | |

OTHER PUBLICATIONS

Title: CRM—Customer Relationship Management, author: Webopedia, 2015.*

Brown—User Flow—2012, Author: Brown, Title: Stop Designing Pages and Start Designing Flows, Smashing Magazine, Located at: http://www.smashingmagazine.com/2012/01/stop-designing-pages-start-designing-flows/, 2012.*

Dey—Context Aware Application—2016, Author: Dey et al., Title: A conceptual framework and a toolkit for supporting the rapid prototyping . . . , located at : http://www.cc.gatech.edu/fce/ctk/pubs/HCIJ16.pdf, 2016.*

CRM—Webopedia, 2015.*

Brown—Uswr Flow—with comments—2012, Published at https://www.smashingmagazine.com/2012/01/stop-designing-pages-start-designing-flows/comment-page-3/#comments, 2012.*

Brown—User flow—2012, publisged at http://www.smashingmagazine.com/2012/01/stop-designing-pages-start-designing-flows/, 2012.*

International Search Report and Written Opinion for International Application No. PCT/US2015/043015, dated Dec. 2, 2015, 12 pages.

* cited by examiner

Genesys

CX BUILDER
Site Overview
Site Properties
Site Variables
Site Commands
Session Recording
Outbound
Tasks
ASR Settings
Diagnostics
Customer Experience Settings — 401a Contact
Assign Contact
Phone: 1-800-123-4567
SMS: 12345, angel
Chat: www.example.com/chat
E-mail: support@example.com Marketplace | My Apps | Dev Platform — 404

SUPPORT

— 409

```
public class OutboundApiInvoker {
  // constants
  public static final String POST = "POST";
  public static final String CONTENT_TYPE = "application/xml";
  // private variables required to send requests
  private String subscriberId = null;
  private String siteNumber = null;
  private String apiKey = null;
  /**
   * Parameterless constructor conforming to bean architecture
   */
  public OutboundApiInvoker() {
  }

/**
   * Places and immediate outbound call
   *
   * Immediate call: https://api.genesys.com/outbound-rest/<SubscriberID>/<SiteNumber>/
immediate?apiKey=<yourapikey>
   *
   * @param waitTime
   * @param phoneNumber
   * @param variables
   */
  public void immediateCall(int waitTime, String phoneNumber, Map<String, String> variables) {
```

SAVE | SAVE&EXIT | EXIT

CONTACT CENTER APPLICATION CREATING USING REUSABLE PROGRAM MODULES

TECHNICAL FIELD

This disclosure relates generally to developing and using artifacts in multichannel communications systems.

BACKGROUND

A developer may develop an application to allow a user to use a personal communications device to contact a company for accessing a service or a product provided by the company. Developers may develop and share applications and/or various building blocks of applications over an application builder platform.

SUMMARY

In a general aspect, an application development platform transmits to a content provider system instructions that, when executed, provide a user interface for developing an application that enables communications between a communications device and a communications system over any of multiple communications channels. The application specifies a first multi-step communication flow between the communications device and the communications system.

The application development platform receives from the content provider system parameters or metadata of a program functionality for inclusion in the application. The application development platform selects one or more recommended program modules for the application based on the parameters of the program functionality.

The application development platform transmits to the content provider system instructions that, when executed, provide a user interface for displaying the one or more recommended program modules and including a user-selectable option for selecting a program module from the displayed program modules. The application development platform receives, from the content provider system, data indicating a user selection of a particular program module from the recommended program modules. In response to receiving the data indicating the user selection of the particular program module, the application development platform transmits, to the content provider system, instructions that, when executed, provide a user interface for enabling user configuration of the particular program module, wherein enabling user configuration of the particular program module includes enabling user modification of default parameters of the particular program module for inclusion in the application.

The application development platform receives, from the content provider system, modified parameters of the particular program module for inclusion in the application. The application development platform determines a second multi-step communication flow between the communications device and the communications system based on the first multi-step communication flow and the modified parameters of the particular program module for inclusion in the application. The application development platform generates an interaction flow document, which includes code for the application specifying the second multi-step communication flow.

Particular implementations may include one or more of the following features. A program module of the one or more of the program modules may be written in one of State Chart Extensible Markup Language (SCXML) or Java™ code.

The application development platform may transmit, to the content provider system, instructions that, when executed, provide a marketplace user interface for displaying a plurality of program modules. The marketplace user interface may enable a user of the content provider system to preview one or more of the displayed program modules and may include user-selectable options for allowing the user of the content provider system to download one or more of the displayed program modules for local storage at the content provider system.

The plurality of program modules may be developed by one or more content provider systems and provided to the application development platform for publishing using the marketplace user interface. One or more of the plurality of program modules may be configured to be executed in programming environments that are different from a programming environment associated with the application development platform.

Selecting the one or more recommended program modules for the application may comprise the application development platform examining a plurality of program modules for presence of functionality that link to application programming interfaces (APIs) used by the application. Based on the examining, the application development platform may select for recommendation one or more of the plurality of program modules that include links to the APIs used by the application.

Selecting the one or more recommended program modules for the application may comprise the application development platform examining one or more of usage data and user feedback associated with a plurality of program modules. Based on the examining, the application development platform may select for recommendation one or more of the plurality of program modules with associated usage data and user feedback that satisfy a predetermined threshold.

Selecting the one or more recommended program modules for the application may comprise the application development platform obtaining a search query based on contextual data representing one or more design criteria of the application. The application development platform may obtain a plurality of program modules including the one or more recommended program modules based on the search query.

One of the user interface for displaying the one or more recommended program modules or the user interface for enabling user configuration of the particular program module may include user-selectable options for enabling a user of the content provider system to view source code associated with a program module. One of the user interface for displaying the one or more recommended program modules or the user interface for enabling user configuration of the particular program module may include options for enabling a user of the content provider system to view metadata associated with a program module. The metadata may include one of input parameters associated with the program module, output parameters associated with the program module, or API dependencies of the program module.

The user interface for enabling user configuration of the particular program module may include user-selectable options for enabling the content provider system to view source code associated with the particular program module. Configuring the particular program module may further comprise a user of the content provider system modifying source code associated with the particular program module.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above described actions. One such computer-readable medium stores instructions that, when executed by a processor, are configured to cause the processor to perform the above described actions. One such system comprises an application development platform that includes a processor and instructions stored in a machine-readable medium that, when executed by the processor, are configured to cause the processor to perform one or more of the above described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 4A-4M illustrate a GUI for an application development platform used by a content provider to create an application for a communications system by including process artifacts and user interaction artifacts.

Like reference symbols in different figures indicate like elements.

DETAILED DESCRIPTION

Figure 1:
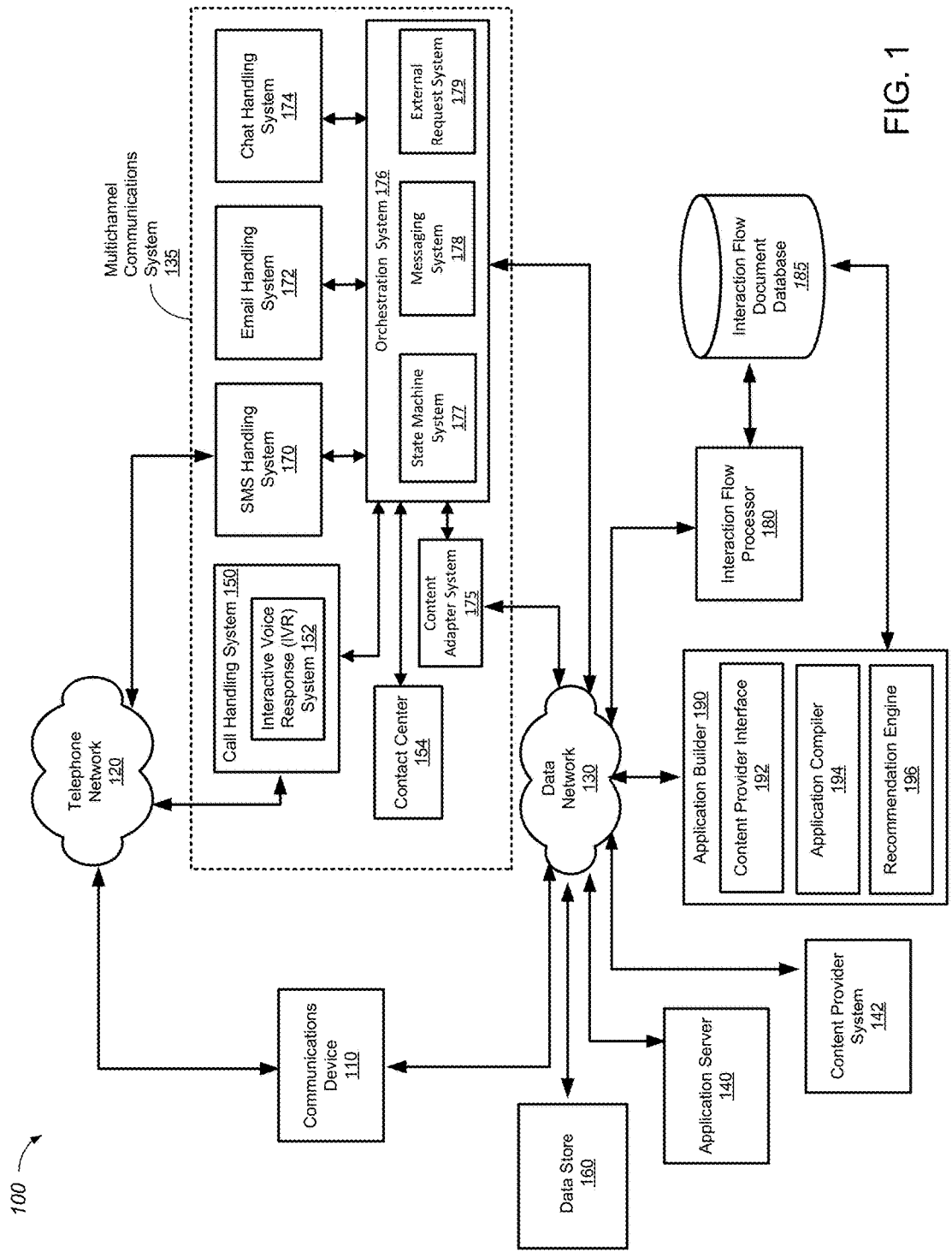
FIG. 1 is a block diagram of a communications system that provides a platform for developing and using artifacts in interaction sites in a multichannel solution platform.

A company (e.g., a service provider or a product provider) may wish to enable its customers to contact it through use of any of multiple different communications modes (e.g., phone, email, web chat, short message service (SMS) or another communications mode that supports communications between a customer and a service or product provider). Each of the multiple different communications modes may offer a similar interactive experience to customers. For example, a customer may interact with the company by any one of phone, email, text messaging, and chat/instant messaging through a web browser (also referred to as web chat) to check his bank account balance or his credit card balance. The interaction flow for these multiple different communications modes, therefore, may share many common states and characteristics.

During a communications session with a customer, the company may wish to interact with customers, at least initially, using an automated response system. In some implementations, use of such an automated response system may decrease the costs associated with responding to customer contacts by decreasing the number of human agents that need to be employed to respond to the customer contacts. Many customer contacts are for routine inquiries (e.g., a customer contacts the company to check the balance of a checking account or of a credit card) and, therefore, lend themselves well to being efficiently and cost-effectively handled through use of an automated response system. In contrast, more complex customer contacts, which are typically far fewer in number, may be routed to human agents for handling.

The interaction between a customer and an automated response system may be designed a content provider offering the product/service using an interaction flow that segments the interaction into multiple discrete steps. For example, when a customer dials a company's telephone number to pay a bill, a voice interaction flow may include the steps of (i) acquiring the customer's account number, (ii) informing the customer of a current balance, (iii) acquiring the customer's payment information, (iv) processing payment, and (v) conducting a customer satisfaction survey. Each of the above automated steps may be implemented using artifacts.

In this application, an artifact (also called interchangeably as a construct or a building block) refers to a computer program, a portion of a computer program or computer software code (also referred to as a "code snippet"), e.g., a program module, which is configured to perform a specific function. An artifact may be one of several different types. An artifact may be a user interaction artifact that is primarily configured to provide functions and/or data that are directly exposed to an end user, such as the customer establishing a communications session with the company in the scenario above. For example, an interaction page that includes data, such as prompts, for interacting with customers, may be a user interaction artifact. In some implementations, the user interaction artifacts may be referred to as foreground or front-end artifacts.

Alternatively, an artifact may be a process artifact that is primarily configured to execute processes, which may be run in the background during interaction with the end user via user interaction artifacts. A process artifact may be a code snippet or module used for measuring various parameters of a communications session. Additionally or alternatively, a process artifact may be used to route the flow of a communications session based on measured parameters. For example, a code module that is used for monitoring a customer's sentiment during a voice call session by analyzing the customer's words for preconfigured keywords may be a process artifact. As another example, a code module that is invoked by an interaction page to route the interaction flow of the voice call session to of several different interaction pages by comparing a numerical score of the customer's sentiment to a predetermined threshold value also may be a process artifact.

A process artifact in turn may be categorized into one of several different types. A process artifact may be a process page, which is invoked by a user interaction artifact, e.g., an interaction page, during a communications session to perform certain functions and subsequently return the flow to another user interaction artifact. For example, the code module described above may be a process page that is invoked by an interaction page. The process page, in turn, routes the communications flow to of several different interaction pages by performing a logic comparison.

Alternatively, a process artifact may be a process interface, which may run as a background process that does not include a link to a front-end artifact, such as an interaction page. For example, the code module described above used for monitoring a customer's sentiment during a voice call session may be a process interface that runs as a background process when a communications session is established.

The process interface may measure values of various metrics that may be used by process pages. For example, the process interface described above may measure the numerical score of the customer's sentiment that is used by the process page described above for comparing to the threshold value.

A process interface may run autonomously or semi-autonomously. For example, the example process interface for customer sentiment monitoring may run as a background daemon process whenever a communications session is established. Alternatively, a process interface may be executed when invoked by other artifacts. For example, the process page described above for routing the communications flow to one of several different interaction pages may invoke the customer sentiment monitoring process interface to compute and return the numerical score of the of the customer's sentiment.

In some implementations, a process artifact may implement front-end functionality, i.e., exposed to the end user. For example, a process artifact may be a stock tool that obtains values of stock prices by making queries to a stock market server. In addition, the process artifact may implement a graphical user interface (GUI) for displaying the stock prices to the user.

In some implementations, an artifact may be a mixed artifact that includes both user interaction artifacts and process artifacts. For example, an interaction site that is configured to specify a multi-step communication flow between a user and an automated response system may be a mixed artifact that includes one or more interaction pages and one or more process pages and/or process interfaces.

An artifact may be written in a suitable programming language. For example, an artifact may be written using a form of extensible markup language (XML). For example, a user interaction artifact that is an interaction page associated with an IVR may be implemented using VoiceXML or speech application language tags (SALT). A process artifact may be written using SCXML, JavaScript™, C#, .NET, or some other suitable programming language.

In an application development ecosystem where there are many developers and content providers, many of the steps in an interaction flow for a communications session may have been already developed by another developer or content provider. For example, multiple developers may have developed various artifacts for recognizing a caller's credit card number by voice, and processing the payment. One process artifact may be implemented to recognize a special accent, while a user interaction artifact may be implemented to ask the end user a series of survey questions. It may be useful to provide developers an application builder platform that offers the ability and flexibility to download, share, design, and develop user interaction artifacts, or process artifacts, or both, that are used in developing applications (e.g., contact center applications such as interaction sites) for multichannel communications systems.

For ease of exposition, the following description begins by describing a voice communications mode involving a voice site, which is configured to receive and respond to telephonic contacts, and then expands the description to cover an interaction site that supports contacts over any one of multiple different communications modes (e.g., email contacts, web chat contacts, and SMS contacts). In a voice communications mode, a customer may call a known customer service number for a product or service. By calling the customer service number, the customer may get connected to a contact handling platform (also referred to as a contact handling system) that enables the customer to interact with a voice site associated with the product or service.

A voice site is a set of scripts or, more generally, programming language modules corresponding to one or more linked interaction pages and process pages, and process artifacts, that collectively interoperate to produce an automated interactive experience with a user. In this context, a script or a programming language model may refer to an artifact as described above. A standard voice site includes scripts or programming language modules corresponding to at least one voice page and limits the interaction with the user to an audio communications mode. Because customers typically access a voice site by calling a telephone number using a voice communications device such as a telephone, a standard voice site is typically referred to as a single mode interaction site, i.e., an interaction site that supports a single type of contact. An enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). An enhanced voice site, therefore, may be referred to as a single mode interaction site that has been enhanced to enable some portions of the interaction flow to involve the communication of multimedia information. Notably, a call may said to be directed to a voice site if it is directed to a telephone number that has been defined as corresponding to the voice site.

The voice site called by the customer may be an automated interactive voice site that is configured to process, using pre-programmed scripts, information received from the customer that is input through the voice communications device being used by the user, and, in response, provide information to the user that is conveyed to the user through the voice communications device. The interaction between the customer and the voice site may be done using an interactive voice response system (IVR) that is included in the contact handling platform that is hosting the voice site.

The contact handling platform is said to be "hosting" the voice site in that it receives and processes the various programming language modules corresponding to the voice site in order to perform the functionality of the voice site. In some implementations, the contact handling platform also may be referred to as a call handling platform, such as when the contact handling platform is configured to handle primarily voice communications, even though the platform may support other communications modes. The contact handling platform may be provided by a third party service provider, which is referred to as a contact handling platform provider (or simply as a platform provider) in this context.

The IVR is configured to support voice commands and voice information using text-to-speech processing and natural language processing by using scripts that are pre-programmed for the voice site, for example, Voice-Extensible Markup Language (VoiceXML) scripts and/or artifacts implemented using State Chart-Extensible Markup Language (SCXML). The IVR interacts with the customer by using audible commands to prompt the customer to provide information and enabling the customer to input the information by speaking into the voice communications device or by pressing buttons on the voice communications device (when using, for example, a touch-tone telephone). The information input by the customer is conveyed to the IVR over a voice communications session that is established between the voice communications device and the IVR when the call is connected. Upon receiving the information, the IVR processes the information using the pre-programmed scripts and/or artifacts. The IVR may send audible responses back to the customer via the voice communications device.

As noted previously, a customer typically accesses a voice site by calling a telephone number using a telephone. A voice site, therefore, is a single channel interaction site in that it receives and responds to contacts that are telephone calls. In contrast, a multichannel or multimodal interaction site receives and responds to contacts in an automated fashion received via any one of multiple different communications channels supported by a multichannel communications system/platform. For example, a multichannel interaction site may receive and respond to contacts that are telephone calls, email messages, SMS messages, and/or chat messages. Moreover, the multichannel interaction site may provide the same interaction flow with the customer irrespective of which channel was used by the customer to initially contact the site. For example, the same or substantially the same interaction flow may be used for enabling the customer to access their bank account information and perform banking transactions, irrespective of which type of contact is used by the customer to contact the bank's automated response system.

In such implementations, the IVR of the contact handling platform is a multimodal IVR that is configured to support the exchange of multi-media information under the direction of the programming language modules of the enhanced voice site. An example of such a multimodal IVR is described in U.S. application Ser. No. 13/092,090, which is incorporated herein by reference for all purposes. The voice communications device also may be an advanced telephonic device (e.g., a smart phone) provided with a display for conveying visual information to the customer, and a processor capable of performing complex tasks such as logic processing wherein the associated instructions may be stored in memory included in the voice communications device. In such implementations, the advanced voice communications device and the contact handling platform hosting the enhanced voice site can interact using one or more of voice, video, images or text information and commands.

Interacting with a multichannel interaction site may be useful in several situations. A multichannel interaction site allows the user to receive the same service, independent of how the user wishes to contact the company associated with the multichannel interaction site and independent of the device that the user wishes to use when contacting the company. For example, if the user is operating a telephonic device but does not wish to talk to a person or a machine, the user may contact customer service for the same product or service via short message service (SMS) using a short code and a keyword. As another example, if the user is operating a laptop computer or other types of communications devices, the user may contact customer service for the same product or service via a chat room using a hyperlink or a website address. As another example, if the user does not have time to complete the entire service transaction in one continuous session, the user may contact customer service for the same product or service via an email and interact with the customer service via the subsequent communication of one or more emails or, alternatively, one or more instant messages or chat messages.

A multichannel interaction site accessed by the user may be an automated interaction site that is configured to process, using pre-programmed scripts, information received from the user that is input through the communications device being used by the user via the communications channel used by the user to contact (i.e., initially contact) the site. The interaction site may, in response, provide information to the user that is conveyed to the user through the communications device via the same communications channel. A standard interaction site limits the interaction with the customer to the mode of communications associated with the communications channel used by the customer to contact the site. A standard interaction site is a set of scripts or, more generally, programming language modules corresponding to one or more linked interaction pages that collectively interoperate to produce an automated interactive experience with a user. A standard interaction site may be either a single channel interaction site (e.g., a standard voice site), which receives and responds to contacts received over a single channel, or a multichannel interaction site, which receives and responds to contacts received over any of multiple different channels.

In contrast, an enhanced interaction site may include scripts or programming language modules corresponding to at least one interaction page and at least one multimodal action page linked to the at least one interaction page that enable interaction with the user to occur via the communications mode used by the user to initially contact the site (e.g., an audio communications mode for a telephone call contact) and at least one additional communications mode (e.g., a text communications mode, an image communications mode or a video communications mode). An enhanced interaction site may, therefore, be either a single channel interaction site (e.g., an enhanced voice site) or a multichannel interaction site that has been enhanced to enable some portions of the interaction flow to involve the communication of multimedia information.

The interaction between the user and the interaction site may be done using a subsystem directed to servicing a particular communications channel (e.g., an IVR, which is directed to servicing telephone call contacts) in a multichannel communications system provided by a service provider that is hosting the interaction site. Each subsystem in the multichannel communications system may be configured to support a particular communications channel, and to process commands and information by using scripts or programming modules that are translated from preprogrammed scripts or programming modules that constitute the interaction site. That is, an interaction site may be a set of scripts or programming modules (including artifacts) that offer a common interaction flow for handling contacts received over different channels. The set of scripts or programming modules may then be translated by an interaction flow processor into a corresponding set of channel-specific scripts or programming modules for each channel supported by the interaction site, and these translated channel-specific scripts or programming modules may then be executed by the respective subsystems of the multichannel communications system to enable automated interactions with users over the different channels. For example, the pre-programmed modules of the interaction site may be extensible markup language (XML) scripts and/or SCXML artifacts. If the user accesses the multichannel communications system by using a telephone to call a telephone number associated with the interaction site, the interaction flow processor may translate the XML scripts of the interaction site to VoiceXML scripts for processing by an IVR to interact with the calling user, and the SCXML artifacts to process modules for executing various functions used to determine the interaction flow.

The interaction site may be hosted by a third party service provider, e.g., the platform provider, that facilitates the creation and hosting of interaction sites on servers owned and operated by the service provider. The service provider may provide a service/method that enables the design, development, and hosting of interaction sites or applications that run a thin client on the communications device that interacts with a fully hosted, on-demand interaction solution platform maintained and managed by the service provider. The service/method provides a way to develop an interaction site that is supported by a multichannel communications system (the server side) and allows a communications interaction between the client and the server to be established via any one of the communications channels supported by the interaction site. In some implementations, the service/method may require an installation of a thin client engine (e.g., an application) on the communications device of the user that mediates between the objects and devices in the communications device and the multichannel communications system supporting the interaction site hosted by the service provider.

In the above scenario, the role of the entity (e.g., the company) providing customer service through the interaction site is that of a content provider. The developer of the entity or company (hereinafter referred to interchangeably as the "content provider") configures the interaction site that is to be used for the particular product or service and provides the logic for the interaction site that is to be executed by the contact handling platform. The content provider may configure the interaction site by using a graphical user interface (GUI) provided by the platform provider for configuring the interaction site. The platform provider handles the interpretation and compilation of the information provided by the content provider, and the creation and hosting of the interaction site based on the information. Since the platform provider manages the contact handling platform, the platform provider may enable the content provider to design an interaction site that supports communications with customers over any one of multiple different communications modes using a single, unified GUI, where the interaction site is executable by the user via any one or more of multiple different communications channels.

The service/method thus enables the deployment of interaction-enabled solutions on communications devices without requiring the content provider to engage in complex programming Applications, or interaction sites, may be designed by the content provider using a web-based or remotely accessible interface, and served on demand to clients. In some implementations, clients can be add-ons that smart phone applications can plug into. In some implementations, the service/method enables users to interact with a multichannel application. The application is referred to as multichannel in that it enables users to contact and interact with a multichannel interaction platform via any of multiple different communications channels (e.g., phone, email, chat, Short Message Service (SMS), or another communications channel that supports communications between the user and the interaction site). For example, the user may contact the multichannel platform (e.g., by phone) and provide information to the multichannel platform by speaking and may receive information from the multichannel platform by hearing. Alternatively, the user may instead choose to contact the multichannel platform (e.g., by SMS, chat room, or email) and provide the same information to the multichannel platform by typing text and receive the same information from the multichannel platform by reading text.

FIG. 1 is a block diagram of a communications system 100 that provides a platform for developing and using artifacts in interaction sites in a multichannel solution platform. Referring to FIG. 1, a user of a communications device 110 (e.g., a smartphone) is able to interact with the communications device 110 to request a service from an interaction site that is provided, for example, by a content provider. The service may be, for example, a request to purchase a particular product or service offered by or made available by the content provider through the interaction site. For example, the user may indicate a desire to request a service from the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to request a service by inputting, via manual selection or otherwise, a telephone number associated with the customer service department into the communications device 110 and initiating a call directed to the inputted telephone number. Additionally or alternatively, the user may indicate a desire to request a service by inputting and sending, via manual selection or otherwise, a SMS message that includes a short code and a keyword associated with the customer service department into the communications device 110. Additionally or alternatively, the user may indicate a desire to request a service by inputting, via manual selection or otherwise, a uniform resource locator (URL) associated with the customer service department into the communications device 110 to initiate a chat session with the customer service department. Additionally or alternatively, the user may indicate a desire to request a service by inputting and sending, via manual selection or otherwise, an email that includes an email address associated with the customer service department into the communications device 110. Additionally or alternatively, the user may indicate a desire to request a service via a communications channel not listed in the above examples.

In some implementations, the request for the service or product may be directed to a multichannel communications system 135, and an interaction site may be invoked, where the multichannel communications system 135 communicates with the communications device 110 to provide the requested service. As mentioned previously, an interaction site may be hosted by a third party service provider or platform provider that facilitates the creation and hosting of interaction sites on servers owned and operated by the service provider. To create an interaction site, an interaction flow defining the steps for providing a service to the user may be developed by a content provider hosting the interaction site on the service provider's servers. For example, a call handling system may present the interaction site to the user using voice messages that are generated by user interaction artifacts implemented using VoiceXML scripts. The call handling system may use process artifacts implemented using XML scripts or SCXML code snippets to monitor the session parameters during a communications session between the user and the interaction site and/or control the flow of the communications session from one voice page to another.

In many applications, the flow for providing a service to the user includes the same or similar steps. For example, an interaction site providing users to shop for clothing and another interaction site providing users to order pizza may both require steps for taking payment information from the users and processing the payment. From a content provider's perspective, it is a burden to require developing each step of an interaction site from scratch, when the function defined by a particular step may have already been developed by other developers in same or different service areas. Accordingly, a communications system that can provide an application builder platform that offers template artifacts and/or recommendations for template artifacts for building interaction sites to a content provider based on its needs may enable a content provider to enjoy a decrease in costs and development time associated with developing interaction sites. Moreover, while the content provider is configuring an interaction site, an application builder platform that provides dynamic recommendations of artifacts for further refining the interaction site may enable a content provider to enhance the quality of the interaction site with greater design flexibility.

The communications system 100 is an example implementation of a system that supports an interactive multichannel development platform for building interaction sites using template artifacts, which may be user interaction artifacts or process artifacts, or both. In general, the communications system 100 includes the communications device 110, a telephone network 120, a data network 130, the multichannel communications system 135, a content provider system 142, an interaction flow processor 180, an interaction flow document database 185, and an application builder 190. The communications system 100 may additionally include an application server 140, and a data store 160.

The communications device 110 is configured to allow a user to interact with an interaction site hosted by the multichannel communications system 135 across the telephone network 120 and/or across the data network 130. The communications device 110 may be a cellular phone or a mobile personal digital assistant (PDA) with embedded cellular phone technology. The communications device 110 may be a computer that includes one or more software or hardware applications for performing communications between the communications device 110 and the multichannel communications system 135. The communications device 110 may have various input/output devices with which a user may interact to provide and receive audio, text, video, and other forms of data.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The data network 130 is configured to enable direct or indirect communications between the communications device 110, the multichannel communications system 135, and/or the application server 140. Examples of the data network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the data network 130 and the telephone network 120 are implemented by a single or otherwise integrated communications network configured to enable communications between the communications device 110 and the multichannel communications system 135.

A multichannel communications system 135 receives a request from the communications device 110 directed towards an interaction site hosted by the multichannel communications system 135, and interacts with the device to provide the requested service through the instruction. The multichannel communications system 135 may include one or more of a call handling system 150, an SMS handling system 170, an email handling system 172 and a chat handling system 174. The multichannel communications system 135 also may include a contact center 154, and content adapter system 175, and an orchestration system 176. The orchestration system 176 may include several components, such as a messaging system 177, a state machine system 178 and an external request system 179.

The call handling system 150 is configured to handle a request to interact with an interaction site using a voice channel. The call handling system 150 may include an IVR system 152 configured to receive a call from the communications device 110 when the communications device 110 is operating under a voice communications channel.

The IVR 152 may include a voice gateway coupled to an interaction flow processor 180 via a data network. Alternatively, the voice gateway may be local to the interaction flow processor 180 and connected directly to the interaction flow processor 180. The voice gateway is a gateway that receives user calls from or places calls to voice communications devices, such as the communications device 110, and responds to the calls in accordance with a voice program that corresponds to a flow of an interaction site. The voice program may be accessed from local memory within the voice gateway or from the interaction flow processor 180. In some implementations, the voice gateway processes voice programs that are script-based voice applications. The voice program, therefore, may include user interaction artifacts written in a scripting language such as, for example, VoiceXML or SALT, and also include process artifacts written, for example, using SCXML, JavaScript or some other suitable programming language. The IVR 152 may also be configured to communicate with the data store 160 to read and/or write user interaction data (e.g., state variables for a data communications session) in a shared memory space.

The SMS handling system 170 is configured to handle a request to interact with an interaction site using a SMS channel. The SMS handling system 170 may include a SMS gateway coupled to an interaction flow processor 180 via a data network, e.g., data network 130. Alternatively, the SMS gateway may be local to the interaction flow processor 180 and connected directly to the interaction flow processor 180. The SMS gateway is a gateway that receives user SMS messages from or places SMS messages to communications devices, such as the communications device 110, and responds to the SMS messages in accordance with a SMS program that corresponds to a flow of an interaction site. The SMS program may be accessed from local memory within the SMS gateway or from the interaction flow processor 180. In some implementations, the SMS gateway processes voice programs that are script-based SMS applications. The SMS program, therefore, may include user interaction artifacts written in a scripting language such as extensible markup language (XML), and process artifacts written using, for example, SCXML or JavaScript. The SMS handling system 170 may also be configured to communicate with the data store 160 to read and/or write user interaction data (e.g., state variables for a data communications session) in a shared memory space.

The email handling system 172 is configured to handle a request to interact with an interaction site using an email channel. The email handling system 172 may include an email gateway coupled to an interaction flow processor 180 via a data network, e.g., data network 130. Alternatively, the email gateway may be local to the interaction flow processor 180 and connected directly to the interaction flow processor 180. The email gateway is a gateway that receives user emails from or places emails to communications devices, such as the communications device 110, and responds to the emails in accordance with an email program that corresponds to a flow of an interaction site. The email program may be accessed from local memory within the email gateway or from the interaction flow processor 180. In some implementations, the email gateway processes email programs that are script-based email applications. The email program, therefore, may include user interaction artifacts written in a scripting language such as XML, and process artifacts written using, for example, SCXML or JavaScript. The email handling system 172 may also be configured to communicate with the data store 160 to read and/or write user interaction data (e.g., state variables for a data communications session) in a shared memory space.

The chat handling system 174 is configured to handle a request to interact with an interaction site using a chat channel. The chat handling system 174 may include a chat gateway coupled to an interaction flow processor 180 via a data network, e.g., data network 130. Alternatively, the chat gateway may be local to the interaction flow processor 180 and connected directly to the interaction flow processor 180. The chat gateway is a gateway that receives user message from or places messages in a chat session to communications devices, such as the communications device 110, and responds to the messages in accordance with a chat program that corresponds to a flow of an interaction site. The chat program may be accessed from local memory within the chat gateway or from the interaction flow processor 180. In some implementations, the chat gateway processes chat programs that are script-based email applications. The chat program, therefore, may include user interaction artifacts written in a scripting language such as XML, and process artifacts written using, for example, SCXML or JavaScript. The chat handling system 177 may also be configured to communicate with the data store 160 to read and/or write user interaction data (e.g., state variables for a data communications session) in a shared memory space.

The contact center 154, among other components, an inbound contact queue, an outbound contact request queue, a session router, an automatic contact distributor ("ACD") administrator, and a plurality of contact center agents. In some implementations, the contact center 154 may include a call center, e.g., when associated with the call handling system 150 and/or configured to handle voice calls. In such implementations, the ACD may include an automatic call distributor.

The contact center 154 may receive one or more contacts from one or more communication devices, such as the communications device 110, via the telephone network 120 and/or via the data network 130. The contact center 154 may make one or more outbound calls to voice communication devices via the telephone network 120, and/or make one or more session connections using other communications modes (e.g., SMS, email, or chat) to communications devices via the data network 130.

Communications to/from the contact center 154 may flow through, and be managed by, the orchestration system 176. The orchestration system 176 may determine an appropriate contact center agent to route a communications session or to assign an outbound contact. The determination of an appropriate agent may be based on agent performance metrics and information known about the inbound or outbound contact. The determination of the appropriate agent may be based on, for example, some or all of the form information, contact parameters measured by process artifacts, and/or other optional information received from the communications device 110.

The state machine system 177 is configured to manage a state machine representing a customer's interaction with the multichannel communications system 135. The messaging system 178 is configured to manage the state machine and requests to communicate with other components of the multichannel communications system 135. The external request system 179 is configured to manage synchronous requests, e.g., Hypertext Transfer Protocol (HTTP) requests, to other systems.

The content adapter system 175 is configured to adapt content associated with the multichannel communications system 135 into the needs of other applications. For example, the content adapter system 175 may include customer relationship management (CRM) adapters, which are configured to allow plugins to external systems, such as Salesforce™, or database lookup systems that use appropriate metadata supplied by the content adapter system 175.

In some implementations, during a communications session with an interaction site hosted by the multichannel communications system 135, the communications device 110 may seek data that is available at remote network servers. For example, the user of the communications device 110 may want to know stock prices that are available at a remote stock market server. In such implementations, one or more process artifacts that are executed for the interaction site may be configured to query the remote network servers to obtain the requested data. For example, the application server 140 may be a remote network server hosting a stock market tool. A process artifact executed for the interaction site may establish a communications session with the application server 140 over the data network 130 to obtain stock prices by querying the stock market tool. In some implementations, the process artifact may use application programming interfaces (APIs) provided by the stock market tool for establishing the communications session with the application server 140 and querying the stock market tool.

In some implementations, the data communications device 110 may include one or more process artifacts for accessing remote network servers. For example, the data communications device 110 may execute a process artifact that obtains weather data from a remote weather server. The process artifact may provide the data to some other application running on the communications device for displaying the weather information on the user interface of the device.

Alternatively, as noted previously, the process artifact may implement a user interface for displaying the weather information directly to the user.

In some implementations, the data communications device 110 may include one or more process artifacts that obtains information about the communications device 110 and provides to applications running either locally on the device 110 or remotely. For example, a process artifact may be configured to determine the geographic location of the device 110 using data obtained from the Global Positioning System (GPS) or some other suitable positioning system. The process artifact may provide the determined geographic location to local or remote applications that make use of the device's location 110. For example, the customer may call a contact center that provides vehicle roadside emergency service. Based on the customer's call, applications running at the contact center may determine the customer's location by obtaining the geographic location of the customer's communications device 110 from the process artifact running on the device 110 that computes the geographic location. In some implementations, the applications running at the contact center may remotely control the process artifact on the device 110 to determine the geographic location.

The interaction flow processor 180 includes all hardware and software components that interface and provide data to the multichannel communications system 135. Depending on the communications channel between the user of the communications device 110 and the multichannel communications system 135, the interaction flow processor 180 sends translated application programs or scripts to the multichannel communications system 135 for processing user interactions. The user interactions are analyzed by the multichannel communications system 135 (e.g., using process artifacts) and new programs or scripts that correspond to the next state of the interaction flow may then be sent to the multichannel communications system 135 for further processing. In some implementations, the interaction flow processor 180 may determine which programs or scripts to provide to the multichannel communications system 135 based on some or all of the information received from the multichannel communications system 135 or the communications device 110.

The interaction flow document database 185 stores interaction flow documents created by the application builder 190, and provides the interaction flow processor 180 access to these interaction flow documents. In some implementations, the interaction flow document database 185 may be an array of high-capacity storage drives that are closely coupled to the interaction flow processor 180. In some implementations, the interaction flow document database 185 may be an array of high-capacity storage drives that are closely coupled to the application builder 190.

The content provider system 142 is configured to allow a content provider to interact with the application builder 190 across the data network 130. The content provider system 142 may be a computer that includes one or more software or hardware applications for performing communications between content provider system 142 and the application builder 190. The content provider system 142 may have various input/output devices with which a content provider may interact to provide and receive audio, text, video, and other forms of data from the application builder 190. In some implementations, the content provider system 142 may be a cellular phone or a mobile personal digital assistant (PDA) with embedded cellular phone technology.

The application builder 190 facilitates the creation of interaction sites. The application builder 190 may include various components, which may be co-located in a single physical location, or they may be geographically distributed, with dedicated high capacity links interconnecting the various components. For example, the application builder 190 may include a content provider interface 192 and an application compiler 194.

The content provider interface 192 is a GUI front-end for an application development tool that can be used to build an interaction site that is capable of handling interactions using multiple communications channels. The content provider may access the content provider interface 192 over the data network 130. For example, the content provider may use a web browser that runs on the content provider system 142. By accessing the application development tool using the content provider interface 192, the content provider may create process artifacts, e.g., process pages and/or process interfaces, and/or user interaction artifacts, e.g., interaction pages, and interaction sites that use these artifacts.

In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to thereby perform the discrete function of the page. Examples of different pages include message pages, question pages, logic pages, transaction pages, and multimodal action pages. These different pages are described in further detail in pending application Ser. No. 14/170,722, which is incorporated herein by reference for all purposes.

An "interface" is a discrete programming routine configured to perform a discrete function, similar to a page. However, unlike pages, an interface may not include links to other pages.

An interaction page is a particular type of page that is configured to perform the function of interacting directly with a user, e.g. delivering content to and/or receiving content from the user, via a communications channel used by the user to contact the multichannel system (e.g., voice communications channel for telephone contacts, chat communications channel for chat contacts, email communications channel for email contacts, and SMS communications channel for SMS contacts). A "voice page" is a particular type of interaction page that is configured to perform the function of delivering audible content to and/or receiving audible content from a user that called a telephone number assigned to the interaction site. The user is typically a caller to an IVR and the audible content is typically speech.

On the other hand, a process page is configured to execute a function in the background that does not involve interacting directly with a user. A process page may be linked from an interaction page or another process page. The process page may control the interaction flow by linking to one of several different pages (either interaction pages or process pages) based on the results of the function execution. As part of executing the function, a process page may utilize metrics computed by one or more process interfaces, as noted previously.

The artifacts and/or interaction sites created by the content provider using the content provider interface 192 are interpreted and/or compiled by an application compiler 194 to generate code modules that are executed by the multichannel communications system interacting with a user accessing the interaction site. In some implementations, the application compiler 194 may generate an interaction flow document, which may include XML scripts or code (i.e., programming modules) that correspond to interaction pages of an interaction site created by the content provider. Additionally or alternatively, the interaction flow document also may include SCXML scripts or Java scripts and other types of executable code using other programming languages based on pages created for the interaction site by the content provider (e.g., based on transaction pages). The interaction flow document may be stored in an interaction flow document database 185. The interaction flow processor 180 may access the scripts from the interaction flow document database 185 and translate them into a language that can be processed by a particular handling system when the multichannel communications system 135 interacts with a user accessing the interaction site.

The recommendation engine 196 is operable to present a recommendation to the developer of the content provider system 142 through the content provider interface 192. That is, the recommendation engine 196 is operable to provide the user (i.e., the developer) with a recommendation for a specific artifact that the recommendation engine 196 has concluded is likely of interest to the developer based on either direct searches conducted by the developer, or inferences drawn from the developer's activities on the application development platform. Additionally, the recommendation engine 196 may provide the recommendation at a time of its own choosing that is deemed most appropriate for the specific artifact. For example, the recommendation engine 196 may provide a recommended process page for routing the flow of an interaction site, if the recommendation engine 196 determines that the interaction site can process the interaction in one of several different ways based on monitoring the session with a caller.

In some implementations, the recommendation engine 196 may determine the recommendation based on the developer's profile data stored in the application builder 190. In some implementations, based on the interactions, the recommendation engine 196 may update the developer's profile data in the application builder 190.

The data store 160 is configured to store user interaction data with interaction sites. In some implementations, the data store 160 may store interaction data associated with a particular user. For example, the interaction data may include the gender and other characteristics of the user, the choices made by the user during each state of the interaction, and the resources utilized during each state of the interaction. In some implementations, the data store 160 may store aggregated interaction data associated with a particular interaction site. For example, the aggregated interaction data may include data specifying a breakdown of genders among all users that accessed the particular interaction site. In some implementations, a user may opt-out such that her usage data is then not stored in the data store 160. In some implementations, a user may opt-in to have her usage data be stored in the data store 160.

In some implementations, the application server 140 is configured to establish a data communications session with the communications device 110 and to receive and send data to the communications device 110 across the data network 130. The application server 140 also is configured to communicate with the call handling system 150 to send data received from the communications device 110 to the IVR 152. The application server 140 also may send other application-related data that did not originate from the communications device 110 to the IVR 152 or, more generally, to the multichannel communications system 135. The application server 140 also is configured to communicate with the data store 160 to read and/or write user interaction data (e.g., state variables for a data communications session) in a shared memory space. The application server 140 may be one or more computer systems that operate separately or in concert under the direction of one or more software programs to perform the above-noted functions. In some implementations, the application server 140 and the call handling system 150 are a single integrated computer system.

In some other implementations, the application server 140 may host a website for performing some other function, as noted previously. For example, the application server may host a stock market website that provides various stock market tools. As another example, the application server 140 may host a weather service website that provides weather data.

In some implementations, one or more of the handling systems in the multichannel communications system 135 may communicatively couple with the application server 140 and the data store 160 via the data network 130. For example, the user of the communications device 110 may download an application from the application server 140, and the downloaded application may include an add-on or plug-in, that, when invoked, enables the communications device 110 to automatically communicate with the multichannel communications system 135 to access an interaction site.

FIGS. 2A-2H illustrate a GUI 200 for an application development platform that recommends artifacts to content providers for application development. In general, each interaction site includes a flow of the interaction states and process states that govern how users interact with the interaction site during the execution of the interaction site. Interaction states may be configured using interaction pages, e.g., voice pages. Process states may be configured using process interfaces or process pages. It may be a tedious process if the content provider is required to configure a process state or an interaction state in all the interaction flows that already may be known to other content providers. The content provider interface 192 of the application builder 190 provides the content provider with a unified interface to create and configure process artifacts and/or user interaction artifacts that are sharable with other content providers.

In some implementations, with a unified interface, a content provider has access to a marketplace of artifacts that may be used in a multichannel communications system. In this context, the marketplace refers to a sharing platform for trading and/or exchanging with other developers/content providers artifacts for use in multichannel communications systems, such as in multichannel contact centers. Some of the artifacts in the marketplace may be publicly available for free, some may be at a cost, and some may be private (e.g., the content provider needs a special key for access to such artifacts). In some implementations, the marketplace of artifacts may be a website that is hosted by a service provider and is accessible via a web-based interface, e.g., the content provider interface 192. The service provider may be the same entity that operates the multichannel communications system 135. However, in other implementations, the marketplace may be an application other than a website and/or it may be hosted by a provider other than the service provider of the multichannel communications system 135.

In some implementations, after the content provider downloads an artifact using the content provider interface 192, the content provider is able to configure the artifact according to the content provider's specifications. For example, the content provider may download an interaction page and modify the interaction page as needed by the content provider. In some implementations, the content provider may simply use an artifact without modification after downloading. For example, the content provider may download a process interface and add the process interface that is configured to measure a Quality of Service metric, e.g., a Mean Opinion Score (MOS), for a communications session. The content provider may add the process interface without modification to the interaction site developed by the content provider for measuring the MOS.

The GUI 200 may be implemented by the content provider web interface 192 and presented to the content provider 142 when the content provider 142 accesses the application builder 190 using a web browser over the data network 130 to create/manage the interaction site. Accordingly, the following describes the different components of the GUI 200 with respect to the system 100. However, the GUI 200 and the associated application development tool may be used by other systems, content providers or application developers to create any interaction site to perform any desired automated interaction flow in response to a customer contact.

Figure 2A:
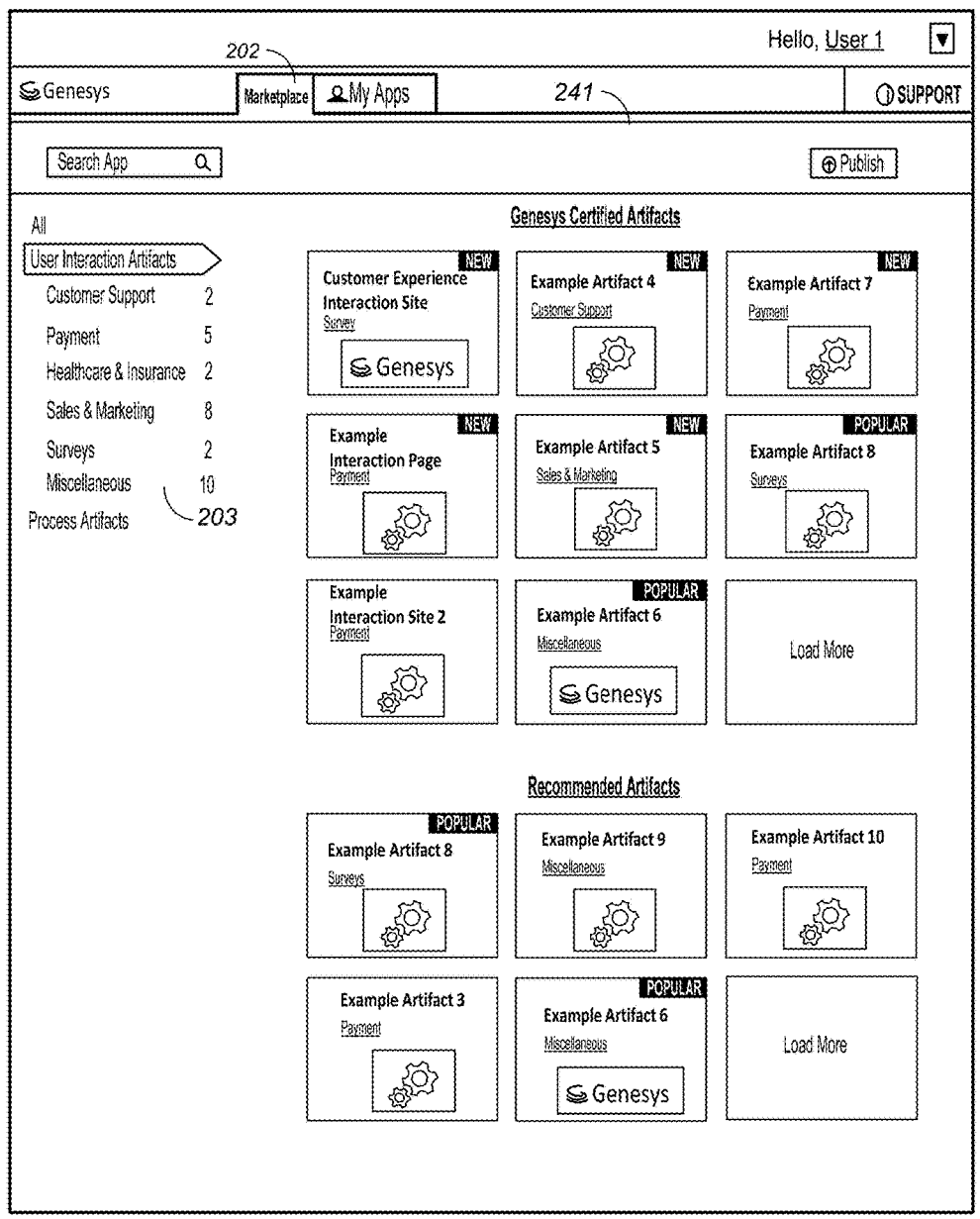
FIGS. 2A-2H illustrate a GUI for an application development platform that recommends artifacts to content providers for application development.
Figure 2B:
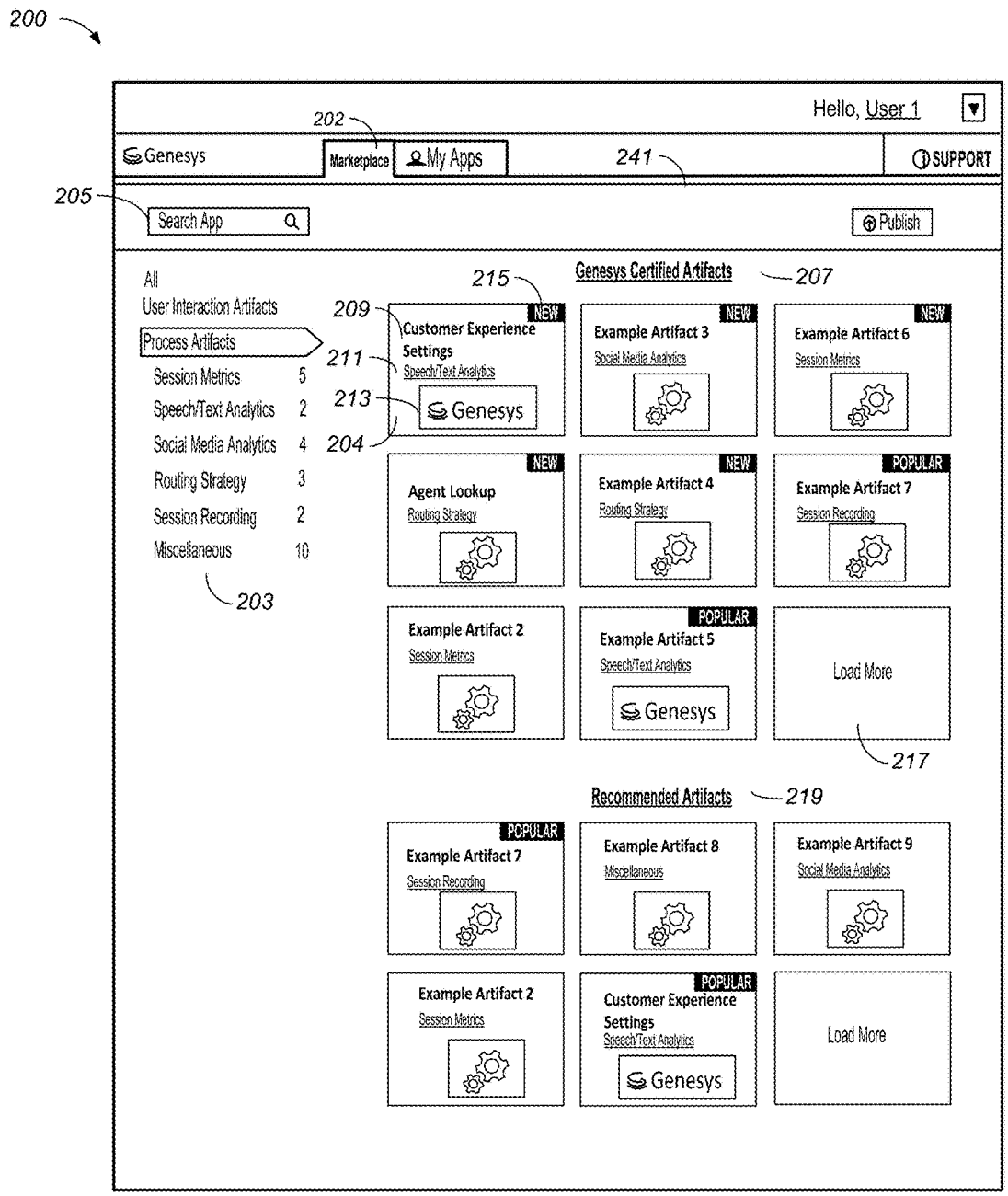

In some implementations, the GUI 200 may provide separate interfaces for displaying user interaction artifacts and process artifacts. For example, FIGS. 2A and 2B illustrate GUI 200 for an application development platform for browsing, searching, and/or viewing user interaction artifacts and process artifacts respectively in a marketplace. However, in some other implementations, the GUI 200 may provide a unified interface for displaying different types of artifacts.

Referring to FIG. 2A, to view the marketplace, the content provider may access the GUI 241 by selecting the "Marketplace" tab 202. The GUI 241 may be divided into different sections. The left panel 203 identifies the selected artifact type, i.e., "User Interaction Artifacts," and the number of artifacts associated with each category within the selected artifact type. As shown, in some implementations user interaction artifacts may include categories such as "Customer Support," "Payment," "Healthcare & Insurance," "Sales & Marketing," "Surveys," and "Miscellaneous." However, in other implementations user interaction artifacts may include other categories not shown here. Thumbnail icons corresponding to user interaction artifacts are shown in the GUI 241 when "User Interaction Artifacts," are selected in the left panel 203. User interaction artifacts are described in greater detail in pending U.S. application Ser. No. 14/193, 407, which is incorporated herein by reference for all purposes.

Referring to FIG. 2B, the content provider may view process artifacts in the GUI 241 by selecting "Process Artifacts" from the left panel 203. Based on the selection, the number of artifacts associated with each category of process artifacts are shown in the panel 203, while thumbnail icons of process artifacts are displayed in the GUI 241. As shown in FIG. 2B, in some implementations process artifacts may include categories such as "Session Metrics," "Speech/Text Analytics," "Social Media Analytics," "Routing Strategy," "Session Recording," and "Miscellaneous." However, in other implementations process artifacts may include other categories not shown here.

In some implementations, the type and category of an artifact is designated by the developer of the artifact. By selecting one of the listed categories in the category section 203, the content provider may filter the category of the artifacts by the selected category.

The search section 205 enables the content provider to input a search query, and the GUI 241 displays artifacts that fit the search criteria. In some implementations, the search query may include one or more search criteria that are associated with attributes of artifacts. Example attributes include the name, the release date, a review, artifact type (e.g., user interaction artifact or process artifact) and artifact category. In some implementations, the recommendation engine 196 receives the search query and obtains a list of recommended artifacts for the content provider.

The GUI 241 may display multiple groups of artifacts to the content provider. For example, the "Genesys Certified Artifacts" section 207 may include artifacts that have been tested and certified by the service provider hosting the marketplace.

In some implementations, the GUI 241 may display "Recommended Artifacts" 219, which includes artifacts of the selected artifact type that have been curated by the recommendation engine 196 as potentially interesting to the content provider. In some implementations, the recommendation engine 196 may recommend the artifacts based on the search query submitted in the search section 205. In some implementations, the recommendation engine 196 may select the artifacts based on the content provider's answers to one or more predetermined questions presented to the content provider. For example, before the content provider enters the marketplace, the application builder 190 may send a list of questions to the content provider. The recommendation engine 196 then determines a list of recommended artifacts based on the content provider's answer. Example questions may include:

"What is the nature of your business?"

"What is your business goal?"

"What is the daily expected call volume?"

In some implementations, the recommended artifacts may be based on machine learning. For example, the recommendation engine 196 may analyze the applications developed and/or used by the content provider and determine artifacts that are relevant to these applications. In some implementations, the recommendation engine 196 may obtain usage data of various artifacts deployed in applications implemented by different content providers. Based on the usage data, the recommendation engine may determine artifacts that have performance criteria above a certain threshold level and only those artifacts that meet the threshold criteria.

In some implementations, the recommendation engine may use actual performance (e.g., response time) as a particular search filter in determining suitable artifacts. In some implementations, the recommendation engine may compare the performance metrics of two artifacts with similar functionality and recommend only the one that has superior performance metrics. In some implementations, the recommendation engine may recommend only artifacts that have been certified by the service provider, e.g., artifacts that have been tested for performance and checked for security issues.

In some implementations, the search query by the content provider may not result in any artifact being found that satisfies the search criteria. This may be the case, for example, when an artifact that meets the content provider's specific needs is not available in the marketplace. In such implementations, the content provider, or the marketplace service provider, may publish a request for development of such an artifact. The request may be made, for example, in a user forum associated with the marketplace. Based on the request, some other content provider or developer may provide an artifact (e.g., one that was privately developed by the content provider or developer) that meets the requirements. Alternatively, some other content provider or developer may create an artifact that meets the requirements and make the artifact available in the marketplace. In this manner, the portfolio of artifacts available in the marketplace may be extended based on requests by content providers.

Each displayed process artifact may be visually represented by a number of attributes on the GUI 241. For example, the process artifact 204 may include an icon 213, a name 209 (e.g., "Customer Experience Settings"), a category (e.g., "Speech/Text Analytics"), and/or a status ("New"). An artifact may be designated as having status "New" if the release date of the artifact is within a threshold date. An artifact may be designated as having status "Popular" if the number of downloads of the artifact satisfies a threshold number.

Process artifacts of different categories and functionalities may be available at the marketplace. For example, process artifacts may include process interfaces and/or process pages that perform the following functionalities: expected wait time announcement for a customer which queries the contact center for actual value; query the contact center for identity of the agent who served the customer during the previous communications session; query the contact center for a list of most recent interactions for a given customer; query the contact center for list of customer's unfinished interactions, and resume an unfinished interaction at an appropriate step; query the backend (e.g., contact center) for list of offers the customer is eligible for; query in real-time a social network for discussion threads on a given subject; posting in real time in a social network an invitation to join a conference call; offering an option to push dialogue tree to customer's end device for preferred rendering (e.g. actual voice dialogue, or text or graphical presentation where customer can navigate to desired end point) and rendering adaptation to customer's end device; automatically retrieving additional information from customer's communications device, such as geo-location, presence, language setting; automatically retrieving password from customer's key-store; measuring QoS MOS; sentiment monitoring/analysis by listening for keywords, or tone of voice, pitch or volume, intensity and rate of speech; data collection module capturing main facts from individual dialogue steps; and survey module, which may automatically trigger a follow-up action depending on the result of a rating.

In some implementations, another type of process artifact available at the marketplace may be a Finite State Machine (FSM) artifact. For example, an SCXML artifact may implement an FSM. An FSM artifact may be executed on the customer's communications device, or alternatively at the contact handling platform, or both.

In some implementations, process artifacts may be available that are configured for interacting with multiple contact centers concurrently, e.g., based on utilizing vendor relationship management (VRM) concepts. For example, a process artifact may allow parameters to be passed from a first communications session with a first contact center to a second communications session with a second contact center. The process artifact may be implemented as part of the contact center applications for both contact centers. The parameter values for an incomplete first session established by a customer's communications device with the first contact center may be captured and stored by the process artifact implemented in the first contact center application. When the customer establishes the second session with the second contact center, the process artifact implemented in the second contact center application may obtain the parameter values for the incomplete first session from the process artifact implemented in the first contact center application, and proceed with addressing the customer's incomplete request.

Figure 2C:
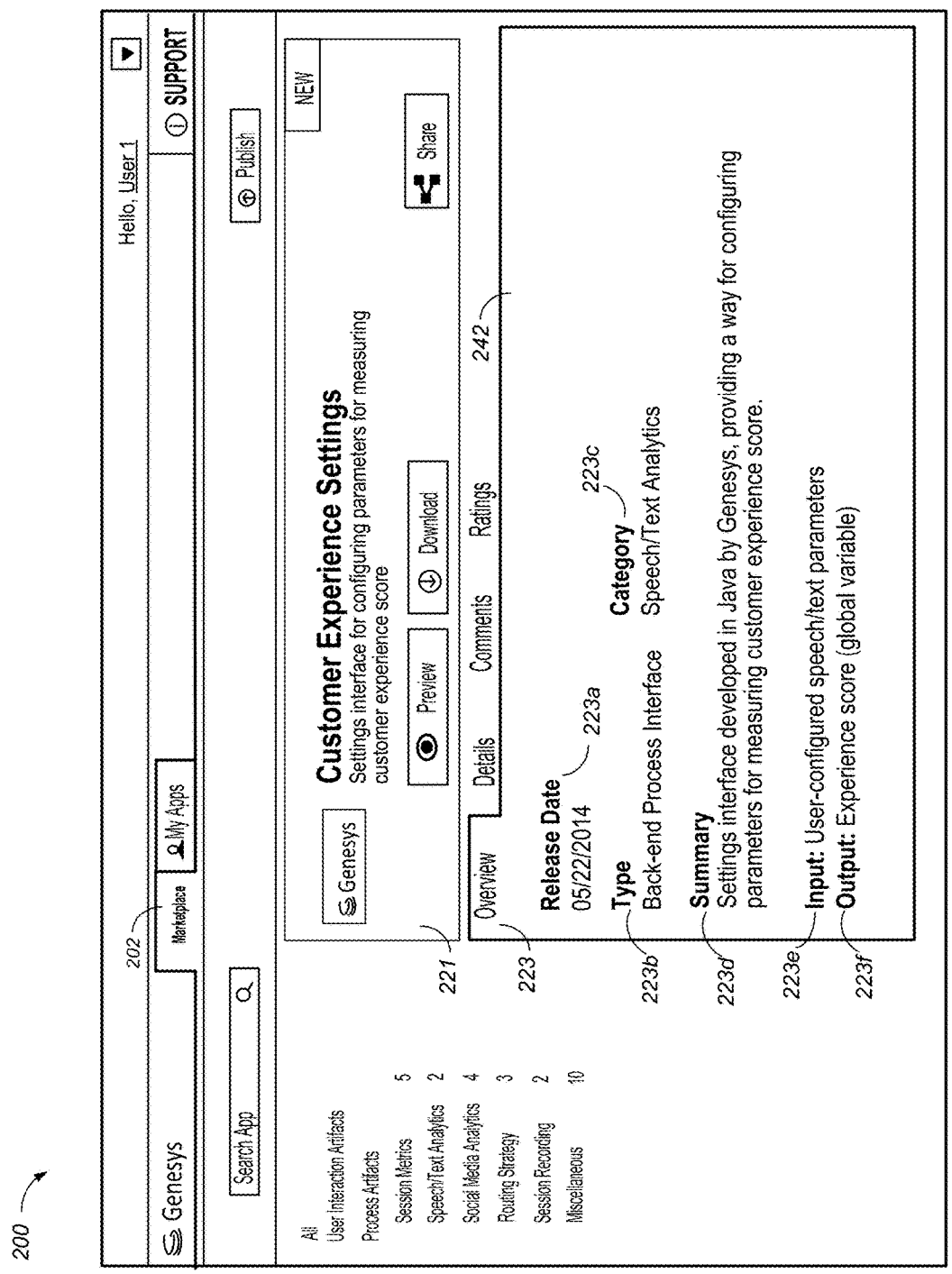

After a content provider has selected one of the process artifacts from the GUI 241, e.g., by clicking on the corresponding thumbnail icon, details of the process artifact are shown on the GUI 200. FIG. 2C illustrates a GUI 200 for an application development platform for viewing the Overview section of a selected process artifact. To display the Overview section of a process artifact in the marketplace, the content provider may access the GUI 242 by selecting the "Marketplace" tab 202, clicking on the artifact 204 to select the artifact and then optionally clicking on the "Overview" tab 223. The Overview section 242 may display information that allows the content provider to get a quick overview about the artifact as described by the developer of the artifact. For example, the Overview section for the Customer Experience Settings process artifact displays the Release Date 223*a*, the Type of the artifact 223*b*, the artifact Category 223*c*, a Summary 223*d* of the artifact, and Input 223*e* and Output 223*f* parameters of the artifact.

The Release Date 223*a* indicates the date when the artifact was made available in the marketplace. The Type 223 of the artifact may further specify whether the artifact is a process interface or a process page. For example, as shown, the Customer Experience Settings artifact is a back-end process interface, indicating that this artifact does not link to any page and runs as a background process either autonomously or semi-autonomously. The Input 223*e* may specify the parameters or variables that are used by the corresponding process to execute properly. In some implementations, the process artifact may not have any input parameters, in which case the Input 223*e* may be blank or may indicate that no parameters are needed. The Output 223*f* may specify the metrics or values that are returned by the corresponding process upon execution. In some implementations, the process artifact may not have any output, in which case the Output 223*f* may be blank or may indicate that no output is provided.

The Overview section 242 may also display statistics about the artifacts (e.g., number of downloads, popularity trends, review, etc.). For example, the review of an artifact may be an averaged numerical value over aggregated reviews by multiple content providers. As another example, the review of an artifact may be determined by interaction data (e.g., drop-call rate, customer satisfaction, etc.) stored in the data store 160.

In this manner, the content provider may access various metadata associated with the process artifact to determine whether the artifact is suitable for the content provider's specific needs. In some implementations, the metadata associated with a process artifact may be embedded as part of the artifact code. When the content provider downloads the artifact, the application development platform used by the content provider may access the embedded metadata to determine the various input/output parameters and other characteristics of the artifact. The application development platform may then determine whether the artifact may be suitable for use in an application developed by the content provider using the platform.

Figure 2D:
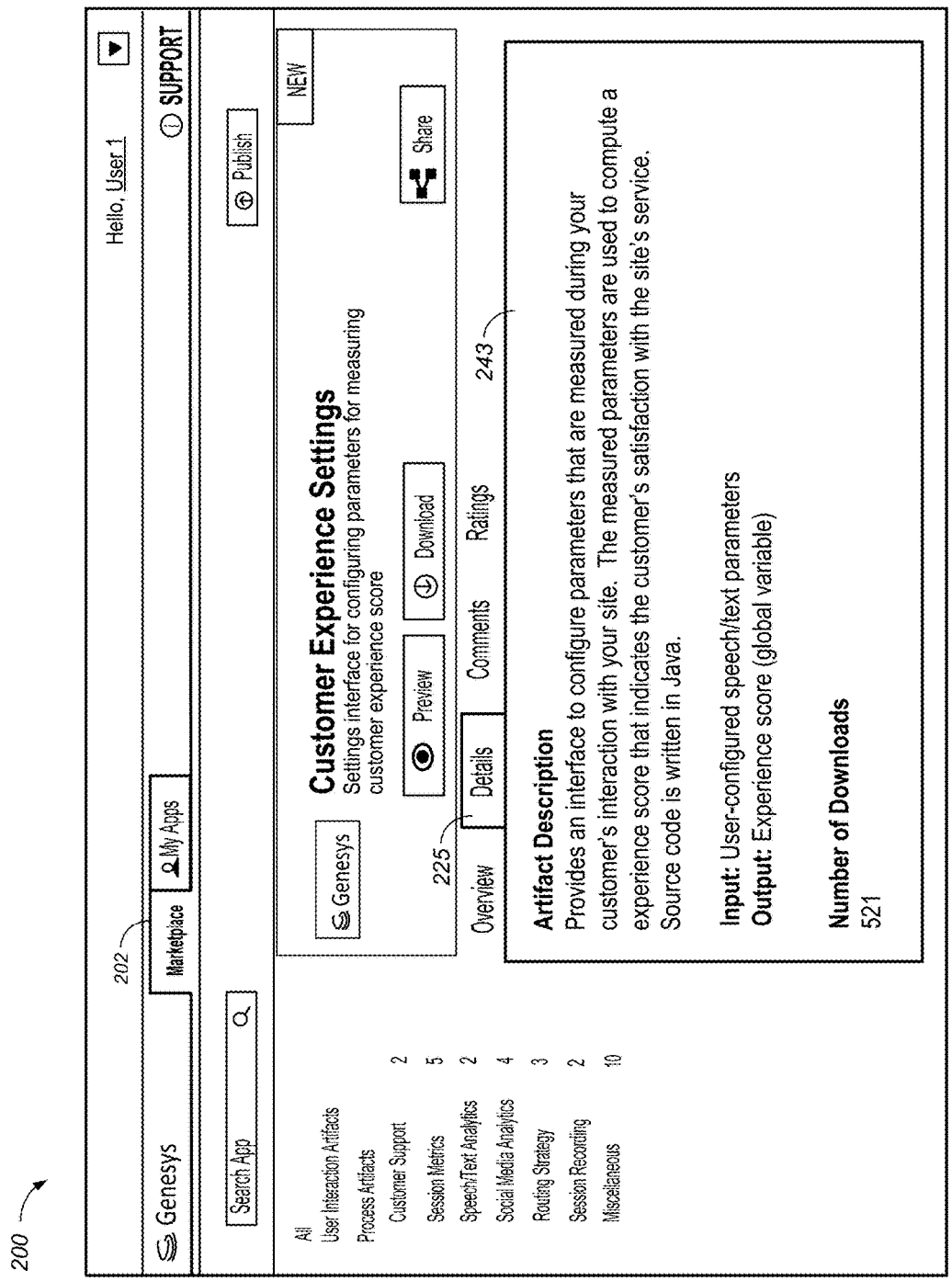

FIG. 2D illustrates a GUI 200 for an application development platform for viewing the Details section of a process artifact. To view the Details section of a process artifact in the marketplace, the content provider may access the GUI 243 by selecting the "Marketplace" tab 202, clicking on the artifact 204 to select the artifact and then clicking on the "Details" tab 225. The Details section 243 may display information that allows the content provider to view detailed descriptions about the artifact as described by the developer of the artifact. In some implementations, the Details section 243 may display information about the Input and Output parameters used by the corresponding process for execution. The Details section 243 may also display statistics about the artifacts (e.g., number of downloads, etc.).

Figure 2E:
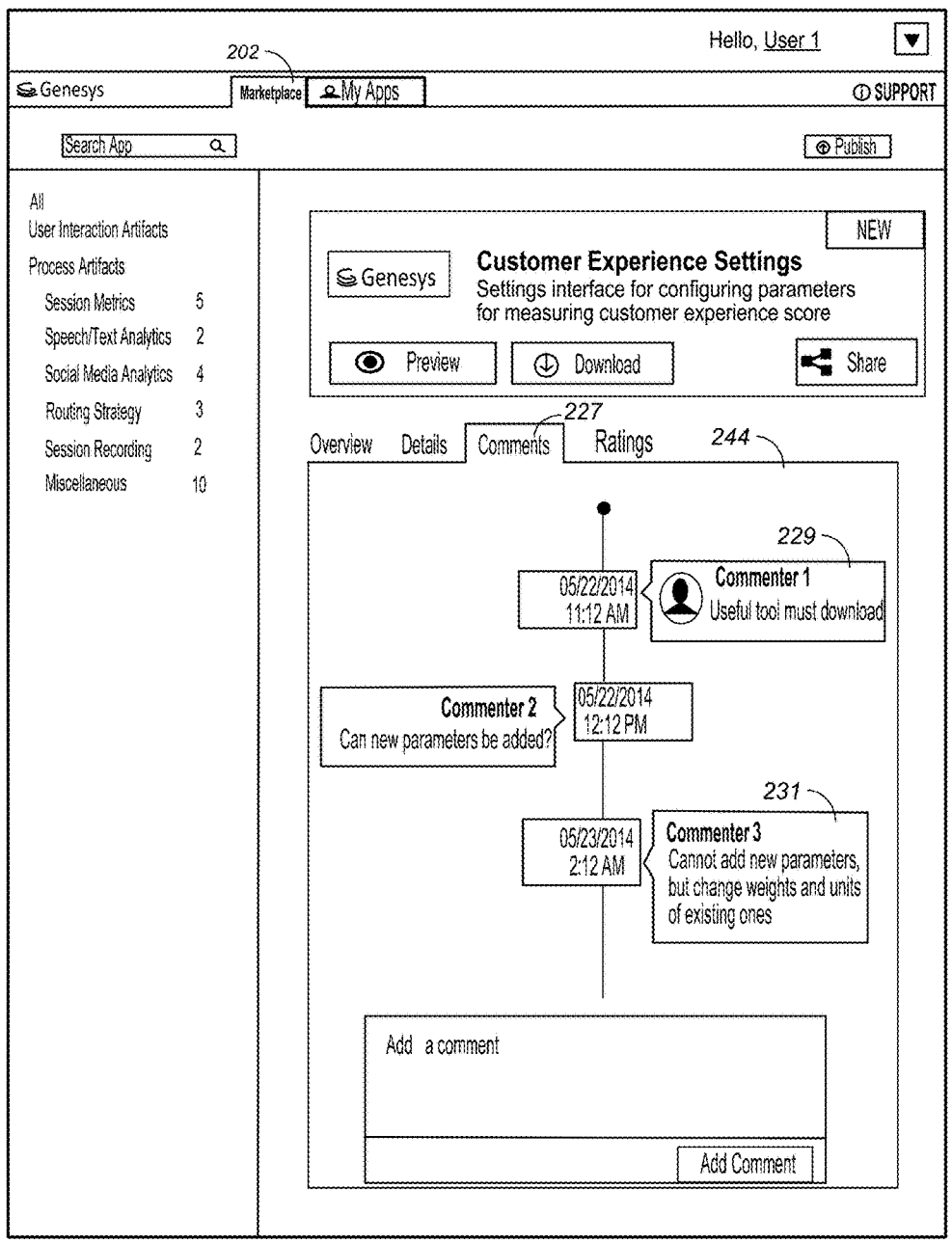

FIG. 2E illustrates a GUI 200 for an application development platform for viewing the Comments section of a process artifact. To view the Comments section of a process artifact in the marketplace, the content provider may access the GUI 244 by selecting the "Marketplace" tab 202, clicking on the artifact 204 to select the artifact and then clicking on the "Comments" tab 227. The Comments section 244 allows the content provider to view comments posted by other content providers, and also allow the content provider to post comments about the artifact. For example, Commenter 1 may make a general comment 229 about the Customer Experience Settings artifact, while Commenter 3 may make a technical comment 231 about the process artifact. The Comments section 244 provides any interested content provider an insight into an artifact before downloading, and also provides a place that content providers may exchange ideas on how to use the artifact, or avoid and/or fix bugs associated with the artifacts, or some other suitable information.

Figure 2F:
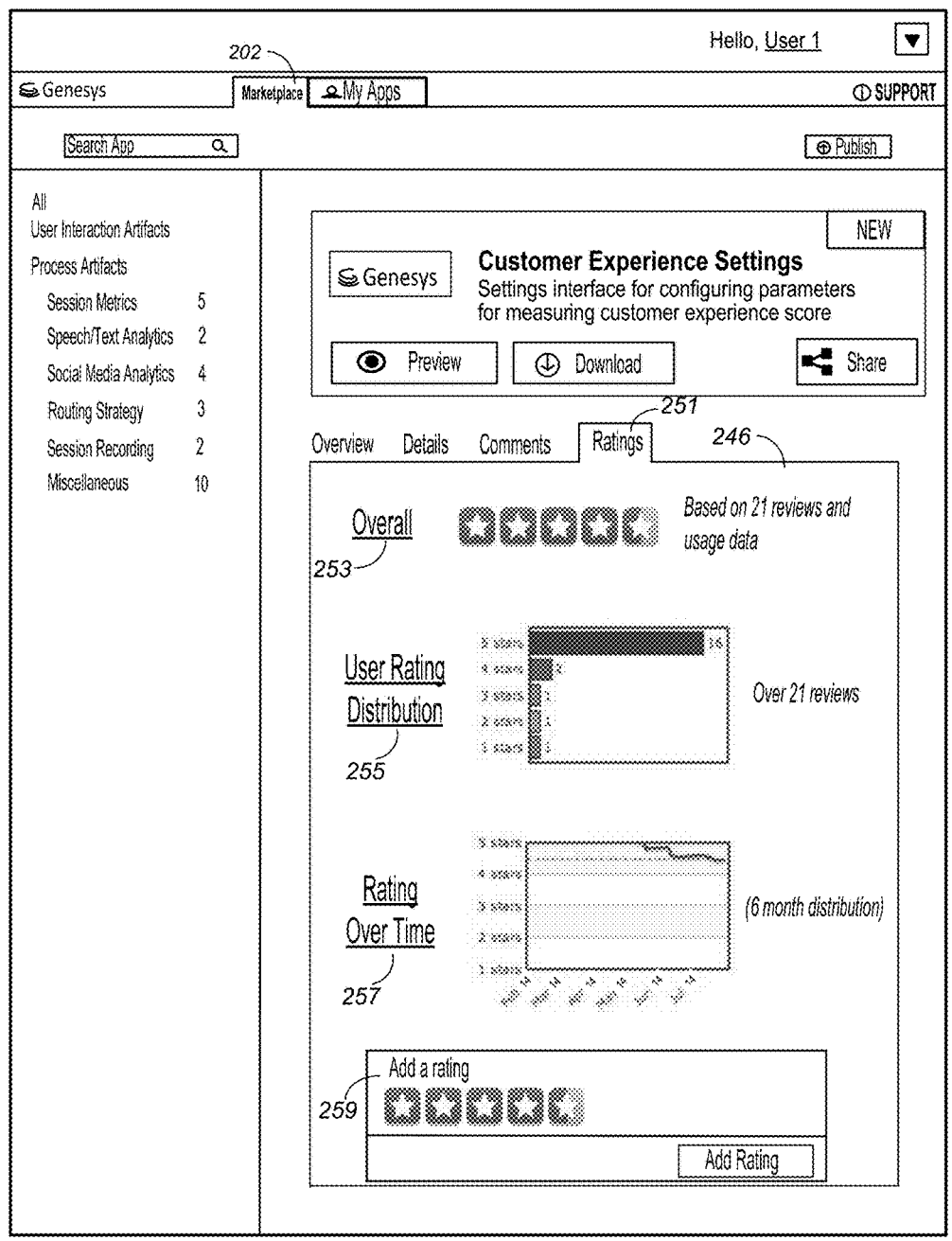

FIG. 2F illustrates a GUI 200 for an application development platform for viewing the Ratings section of a process artifact. To view the Ratings section of a process artifact in the marketplace, the content provider may access the GUI 246 by selecting the "Marketplace" tab 202, clicking on the artifact 204 to select the process artifact and then clicking on the "Ratings" tab 251.

The Ratings section 246 allows a content provider to view an overall rating 253 of a process artifact. The overall rating 253 may relative score on some scale, e.g., on a scale of 1 to 5 stars, with 5 being the highest rating. The overall rating 253 may be based on feedback from other content providers and/or developers. Additionally or alternatively, the overall rating 253 may be based on machine learning, such as feedback about the usage of the process artifact in actual deployment. For example, the service provider hosting the marketplace may track data regarding use of the process artifact in interaction sites. The usage data may include, for example, success rate of the process artifact in completing tasks; time taken to complete tasks; resources used by the process artifact in task execution, such as number of calls made to a back-end server; crash reports, among other suitable metrics.

Content providers may configure interaction sites to send such usage data to the marketplace service provider either periodically, or based on significant events, or both. Additionally or alternatively, the marketplace provider may include tracking code in the process artifact that periodically sends such usage data to a ratings process hosted by a marketplace server.

In some implementations, the code for tracking usage of process artifacts may be implemented by other process artifacts, which may be available for download from the marketplace. In some implementations, content providers or developers may create artifacts that may be used for tracking the performance of other process artifacts and/or user interaction artifacts, and make them available on the marketplace.

In some implementations, the marketplace service provider may compute the overall rating 253 of the process artifact based on a combination of the user ratings and the usage data. For example, the overall rating may be a weighted average of the user ratings and the usage data.

The Ratings section 246 may allow a content provider to view other data associated with the rating of a process artifact. For example, the Ratings section 246 may provide information on the user rating distribution 255, which may show a breakdown of the scores given to the artifact by the content providers/developers who have rated the artifact. The user rating distribution 255 may be presented in graphical form, such as a bar chart as shown, or a pie chart or histogram, or some other suitable representation.

The Ratings section 246 also may provide information on the rating over time 257, which may provide information on how the overall rating of the artifact has varied over time. In some implementations, the rating over time may be presented for a certain time period, such as a 6-month distribution, as shown.

The Ratings section 246 may allow the content provider/developer to add a rating 259 about the artifact. For example, the content provider may score the artifact on an ascending scale of 1 to 5 stars. When the content provider adds its rating to the marketplace, the overall rating 253 of the artifact, one or more of the user rating distribution 255 and the rating over time 257 may be updated to include the content provider's rating.

Figure 2G:
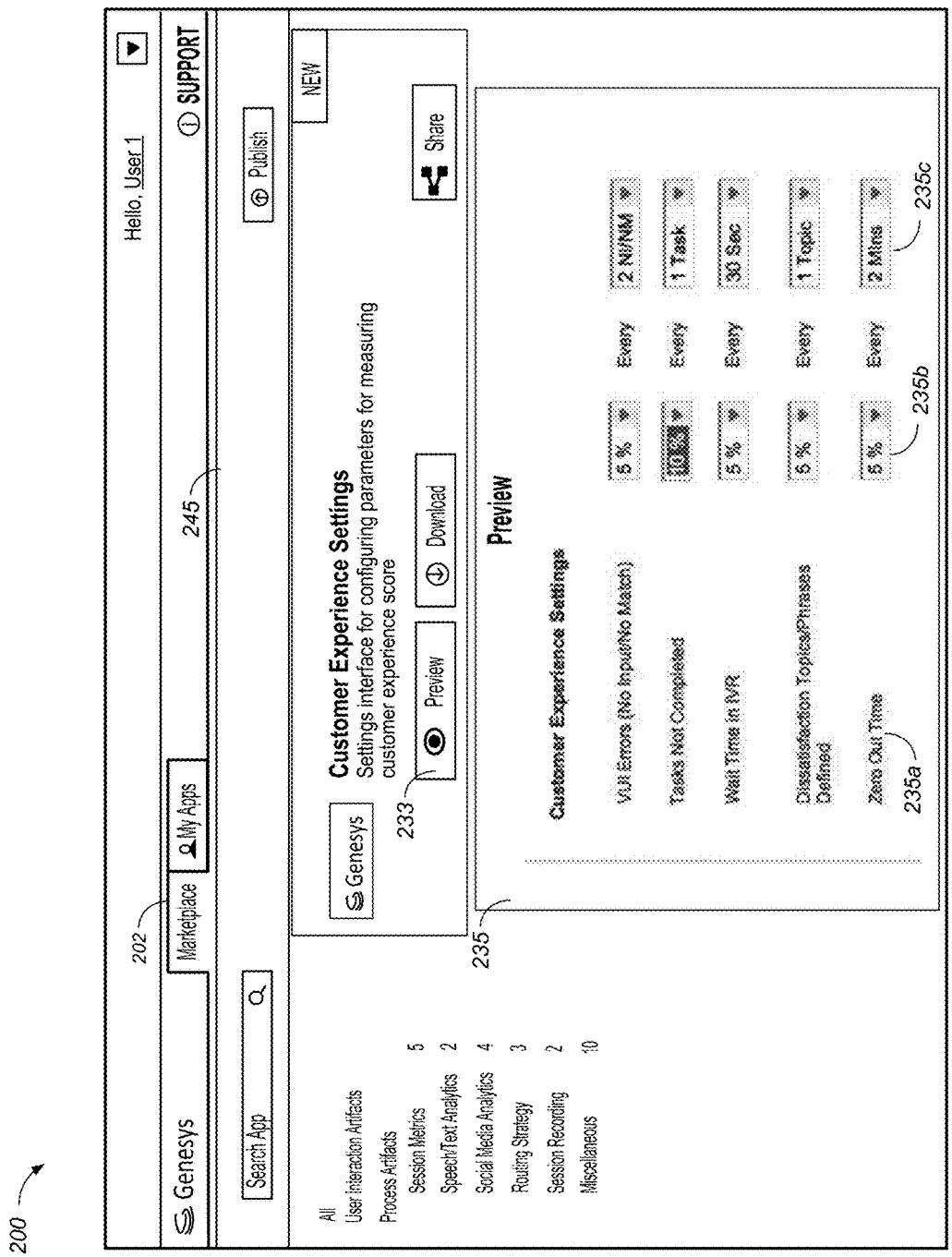

FIG. 2G illustrates a GUI 200 for an application development platform for previewing a process artifact with a user interface. To preview the process artifact in the marketplace, the content provider may access the GUI 245 by selecting the "Marketplace" tab 202, clicking on the artifact 204 to select the artifact and then clicking on the "Preview" button 233. The preview section 235 shows a template of the process artifact as it will be viewable to the content provider, and allows the content provider to get a more in-depth exposure to the artifact before downloading the artifact to the content provider's collection. For example, the preview section 235 displays the user interface of the Customer Experience Settings process artifact. As shown, the content provider user interface of the Customer Experience Settings process artifact includes multiple speech/text input parameters 235*a* (as indicated by 223*e*). For each displayed parameter, the preview section exposes one or more weight fields 235*b* and/or units of measurement 235*c* that can be configured by the content provider when the process artifact is included in an interaction site.

Since the Customer Experience Settings process artifact is a background process interface, in some implementations it will run as a background process when a communications session is established with the corresponding interaction site. The background process will measure values of the input parameters 235*a* using the units of measurement 235*c* for the established communications session. As indicated by 223*f*, the background process will compute an experience score for the customer during the communications session using the measured values of the parameters 235*a*, with each parameter weighted by the weights 235*b* configured by the content provider. The computed customer experience score output parameter will be returned by the background process as a global variable.

Figure 2H:
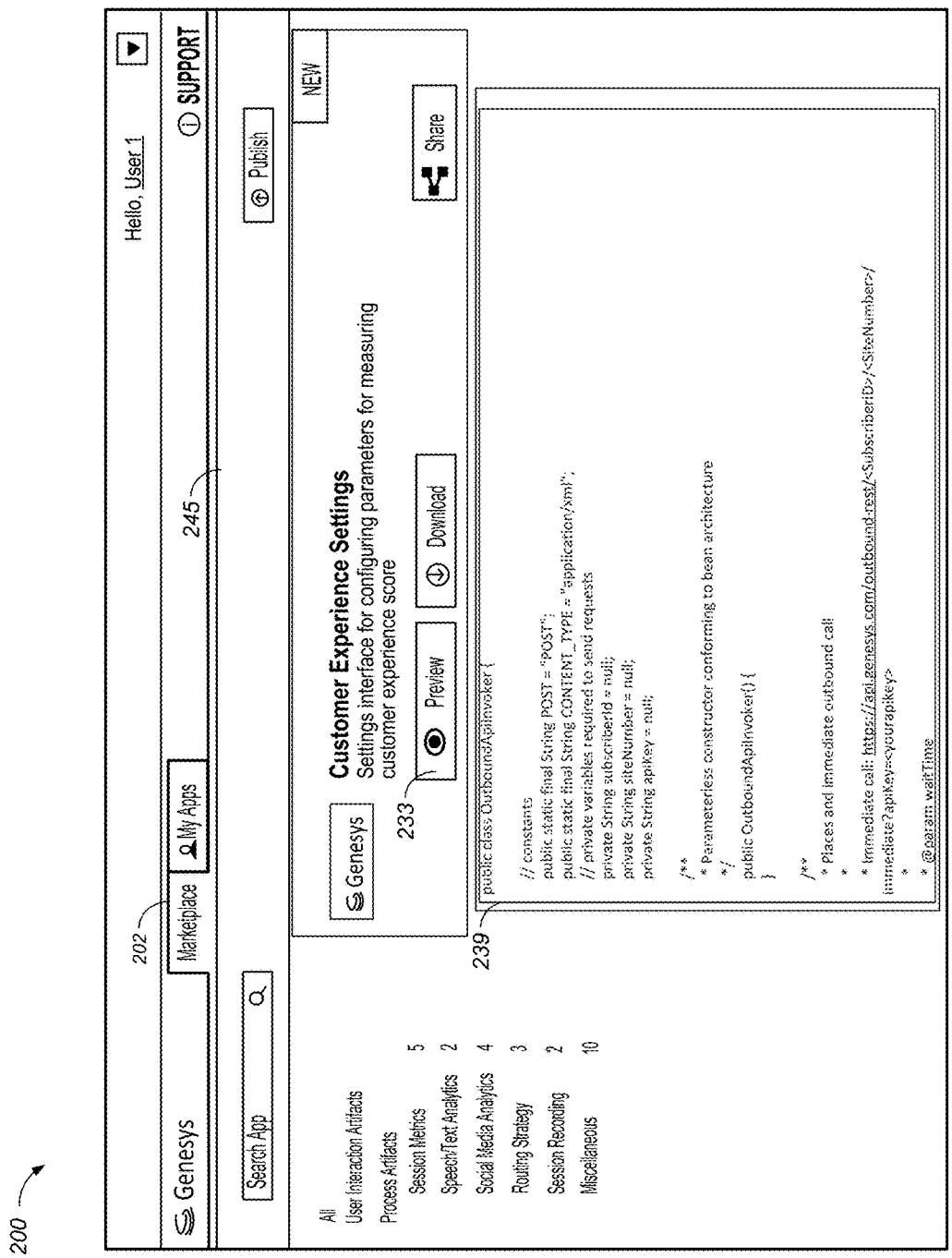

FIG. 2H illustrates a GUI 200 for an application development platform for previewing a process artifact in code form. This may be the case, for example, for process artifacts that do not include user interfaces.

To preview the process artifact in code form, the content provider may access the GUI 245 by selecting the "Marketplace" tab 202, clicking on the artifact 204 to select the artifact and then clicking on the "Preview" button 233. The preview section 239 shows the code of the process artifact, and allows the content provider to get a more in-depth exposure to variables and API dependencies (such as for specific application development platforms), among others, of the artifact before downloading the artifact to the content provider's collection. For example, the preview section 239 displays the code of the Customer Experience Settings process artifact that is written using Java. As shown, the code includes variable declarations and routines that make calls to APIs provided by an application development platform. The structure of the process artifact code snippet that is previewed may identify data that must be extracted and/or provided for the artifact to operate properly, and data that is optional, which the artifact may optionally use during operation.

A process artifact in code form may be used by the content provider by downloading and/or copying the code of the artifact into source code of an application being developed by the content provider. The content provider's application may include user interfaces, e.g., it may be an interaction site that the content provider is implementing by accessing the source code. Alternatively, the content provider's application may exclude user interfaces.

The content provider may use the process artifact code in an integrated development environment (IDE) for developing applications. Such an IDE may be generic, i.e., not tied to any specific proprietary development platform, and/or may be used to design various types of applications, including contact center applications, web-based information processing applications, among others.

The examples describe above are not limiting. A GUI for an application development platform that recommends process artifacts to content providers for application development may have more or fewer configurable parameters than the GUIs described in FIGS. 2A-2H.

Figure 3:
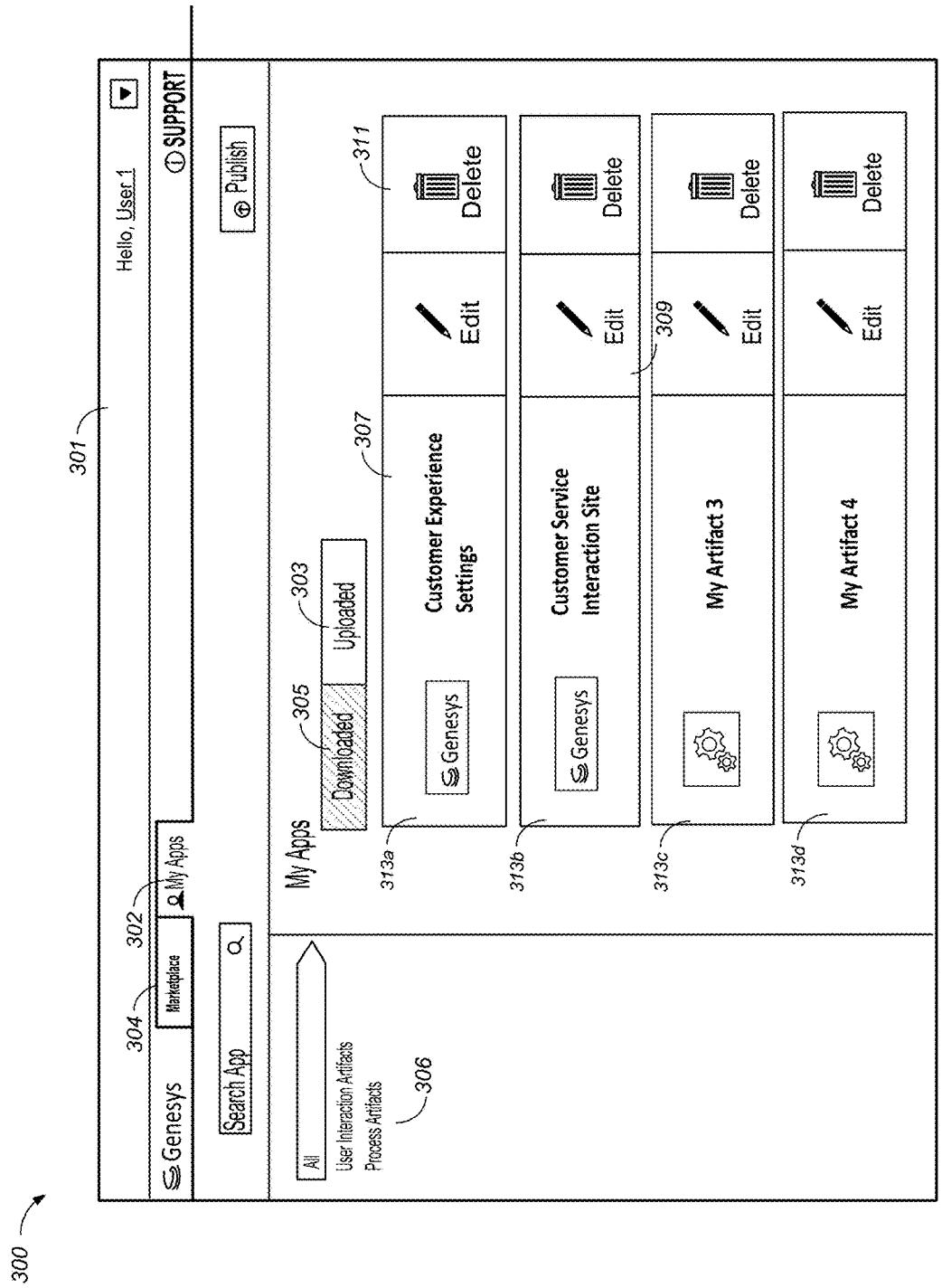
FIG. 3 illustrates a GUI for an application development platform for managing a content provider's artifacts.

FIG. 3 illustrates a GUI 300 for an application development platform for managing a content provider's artifacts. In some implementations, the GUI 301 shows both process artifacts and user interaction artifacts, for example when the option "All" is selected from the left panel 306. However, in other implementations, the GUI 301 shows either process artifacts, or user interaction artifacts.

In general, after the content provider has successfully downloaded an artifact (e.g., a process artifact such as "Customer Experience Settings," or an user interaction artifact), the content provider may manage the artifact owned by the content provider. To view the content provider's artifacts, the content provider may access the GUI 301 by selecting the "My Apps" tab 302. In some implementations, "My Apps" may be a button under the "Marketplace" tab 304. In such implementations, the content provider may access the GUI 301 by selecting the "Marketplace" tab 304, and then clicking on the "My Apps" button within the tab 304.

The "Downloaded" button 305, when selected, enables the content provider to edit and/or delete artifacts that the content provider has downloaded from the marketplace. For example, as shown, the content provider has downloaded from the marketplace the Customer Experience Settings process artifact 313a, Customer Experience Interaction Site user interaction artifact 313b and other artifacts 313c, and 313d. The "Uploaded" button 303, when selected, enables the content provider to edit and/or delete artifacts that the content provider has uploaded to the marketplace.

For each artifact shown in GUI 301, the name section 307 provides information of the artifact's name. The "Edit" section 309 enables the content provider to edit the artifact. For example, the content provider may edit process artifacts as described in FIGS. 4A-4M. The "Delete" section 311 enables the content provider to remove the artifact from the content provider's artifact list.

The examples describe above are not limiting. A GUI for managing a content provider's artifact may have more or fewer configurable parameters than the GUIs described in FIG. 3.

A content provider may use process artifacts, either developed by the content provider or downloaded from the marketplace as described above, in designing applications using a suitable application development environment. As noted previously, the process artifacts may include SCXML or Java code, or some other suitable programming module. In some implementations, a process artifact code may include API plugins provided by a development platform, such as one hosted by the marketplace service provider. For example, a process artifact may include SCXML or JavaScript code that makes calls to RESTful APIs provided by a Representational state transfer (REST)-based cross-platform development environment, such as CX Designer (CXD) hosted by Genesys. The RESTful APIs may be implemented inside of a Spring model-view-controller (MVC) framework and packaged as a web application archive (.war) file, which may include other backend module dependencies for the CXD.

The content provider may access the CXD and/or the RESTful APIs from a database hosted by the platform provider, e.g., an Apache Cassandra database hosted by Genesys. The content provider may use code of artifacts downloaded from the marketplace with the application code developed using CXD by integrating the artifact code into the application using the RESTful APIs.

In some implementations, the content provider may use process artifacts downloaded from the marketplace in developing interaction sites that include diverse interaction channels without being limited to any particular communication mode. For example, the SCXML and/or JavaScript artifacts may be used to develop sites that involve one or more of SMS, email, web-based interaction, IVR, or some other suitable mode or a combination of different channels.

FIGS. 4A-4M illustrate a GUI 400 for an application development platform used by a content provider to create an application for a communications system by including process artifacts and user interaction artifacts. For example, the content provider may implement an interaction site for use in a contact center using application development platform. The GUI 400 may be implemented by the content provider interface 192 and presented to the content provider 142 when the content provider 142 accesses the application builder 190 using a web browser over the data network 130 to create/manage the interaction site. Accordingly, the following describes the different components of the GUI 400 with respect to the system 100. However, the GUI 400 and the associated application development tool may be used by other systems, content providers or application developers to create contact center applications that include process artifacts and/or user interaction artifacts. In some implementations, the GUI 400 may correspond to the "CX Builder" development platform provided by Genesys.

Figure 4A:
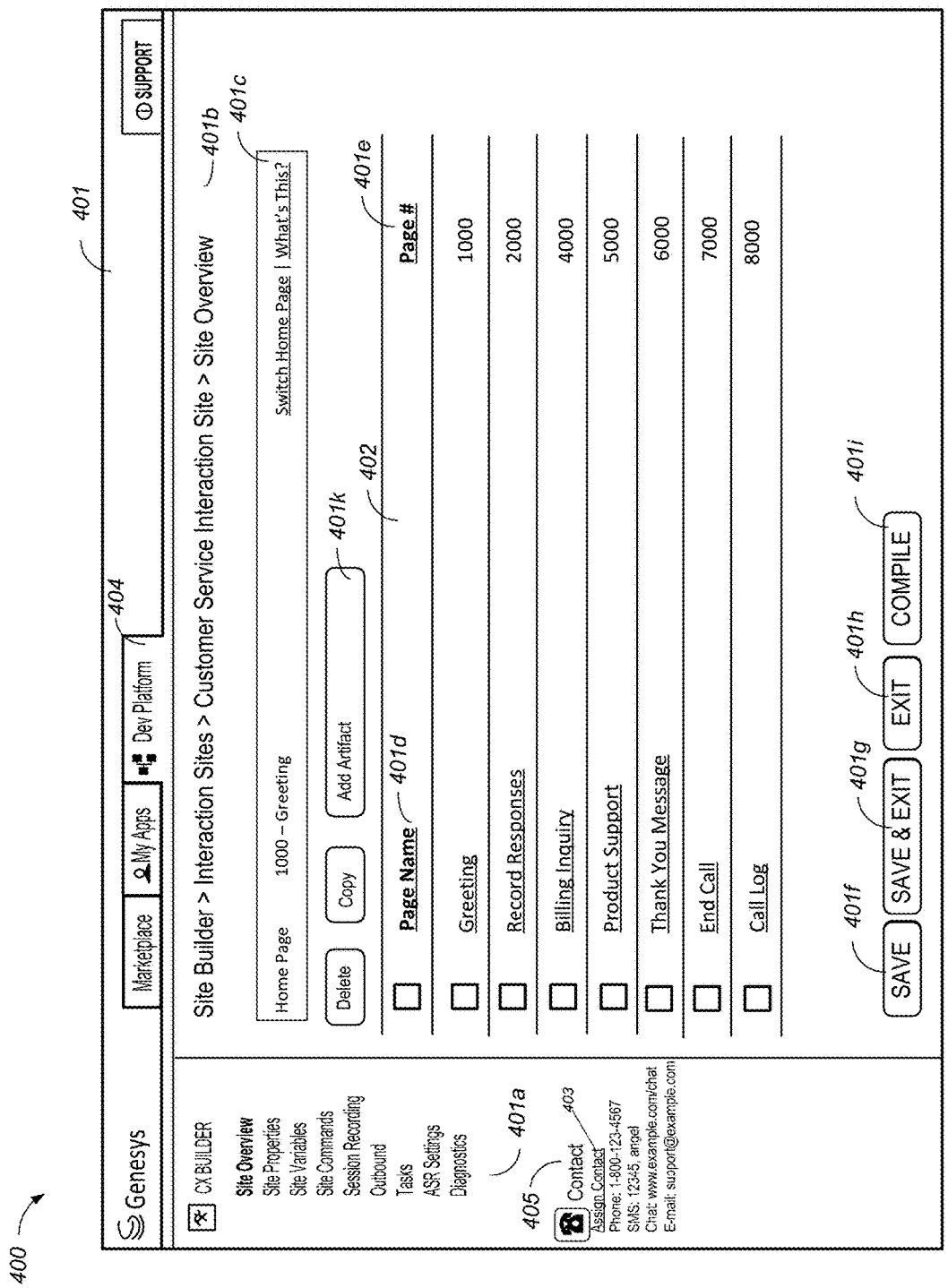

FIG. 4A illustrates an example GUI of an interaction site overview page 401 that may be presented to the content provider, for example, when the content provider clicks on the "Edit" button 309 of the "My Apps" page 301 to configure the interaction site "Customer Service Interaction Site" corresponding to the user interaction artifact 313b. The "Dev Platform" tab 404 shows that the content provider is accessing the configuration tool of the application development platform. The Site Overview page 401 may be accessed by the content provider, for example, by clicking on the "Site Overview" link in the left panel 401a. The Site Overview page 401 provides a listing of template interaction pages and process pages associated with this template interaction site downloaded by the content provider. The name of the interaction site is specified in the heading 401b of the Site Overview page 401 (e.g., "Customer Service Interaction Site").

When the user of the communications device 110 interacts with the interaction site, the first page that is processed is identified in the "Home Page" field 401c. The content provider may specify any page (e.g., interaction page or process page) that the content provider wants to be processed first as the Home Page 401c. The order in which the various pages are processed is determined by the links in the respective pages. Each interaction page usually includes a link to the next page that is to be processed. Each process page may include links to one or more pages, one of which may be processed as the next page based on the logic executed by the process page. For example, the interaction site illustrated in the Site Overview page 401 has an interaction flow 402 of seven pages, including the interaction pages "Greeting", "Billing Inquiry", "Product Support", "Thank You Message", "End Call", and "Call Log," and the process page "Record Responses." Each page may be identified by a page name that is shown in the Page Name field 401d. Additionally or alternatively, each page also may be identified by a page number that is shown in the Page # field 401e. The combination of page name and page number uniquely identifies a page. A user may access and modify any of the pages displayed in the interaction flow 402 by selecting them from the displayed list.

Importantly, a second page that is processed after the processing of a first page may be said to be directly linked to that first page if the first page includes a direct link to the second page without any intervening pages. Alternatively, a second page may be said to be indirectly linked to the first page if that first page is linked to the second page in the interaction flow with one or more pages being processed between the processing of the first page and the processing of the second page.

The content provider may save the interaction site by selecting (e.g., clicking) the "Save" button 401f. The content provider may save the interaction site and then exit the GUI 401 by selecting the "Save & Exit" button 401g. The content provider may exit the GUI 401 without saving the interaction site by selecting the "Exit" button 401h. The content provider may compile the interaction site by clicking the "Compile" button 401i, where the application compiler 194 may compile the process artifacts and/or user interaction artifacts, including input/output parameters, into an interaction flow document, and may save the interaction flow document in the interaction flow document database 185.

The Contact section 405 lists the contact information associated with each of the multiple channels for the interaction site "Customer Experience Interaction Site". For example, a user may access the interaction site via one or more of: a voice channel by calling the number "1-800-123-4567"; via an SMS channel by sending a text message with the short code "12345" and the keyword "angel"; via a Chat channel by accessing the URL "www.example.comichat"; or via an E-mail channel by sending an e-mail to the address "support@example.com." The "Assign Contact" link 403 allows the content provider to define the contact information for an interaction site.

Figure 4B:
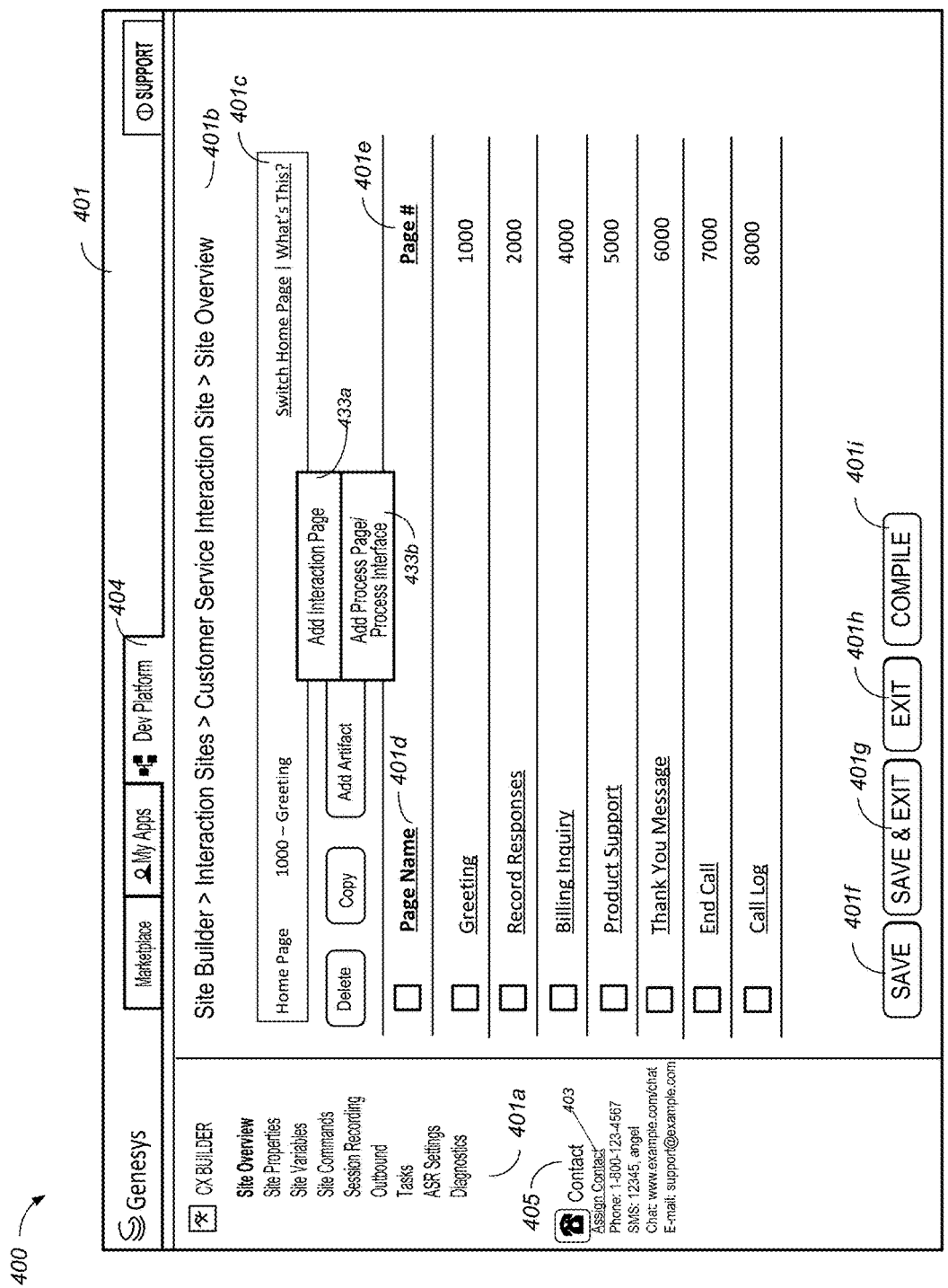

The content provider may add a new artifact by selecting (e.g., clicking) the "Add Artifact" button icon 401k. When the button icon 401k is selected, one or more options may be displayed for adding a new user interaction artifact (e.g., an interaction page) or a process artifact (e.g., a process interface or process page) to the interaction flow 402. For example, as shown in FIG. 4B, a heads up display with user-selectable options 423a and 423b may be displayed on the GUI 401 when the content provider selects the button icon 401k. The content provider can select the "Add Interaction Page" 423a to add an interaction page to the interaction site. Examples of adding interaction pages to the interaction site are described in greater detail in pending U.S. application Ser. No. 14/193,407, which is incorporated herein by reference for all purposes.

The content provider can select "Add Process Page/Process Interface" 423b to add a process artifact to the interaction site. In some implementations, when the content provider selects "Add Process Page/Process Interface" 423b, the development environment may present the GUI 301 and show the process artifacts that have been downloaded by the content provider and locally stored associated with the content provider's development machine. In some other implementations, when the content provider selects "Add Process Page/Process Interface" 423b, the development environment may present the GUI 241 and display process artifacts that are available in the marketplace for the content provider to download and use in the interaction site. In some implementations, the content provider may navigate from the marketplace GUI 241 to the My Applications GUI 301 and vice versa.

When the development environment presents the GUI 241 or the GUI 301 based on selection of the "Add Process Page/Process Interface" 423b, the content provider may select a suitable process artifact either from the marketplace or from the previously downloaded artifacts, and include the selected process artifact in the interaction site. For example, the content provider may select the "Customer Experience Settings" artifact from either the marketplace GUI 241 or the GUI 301. Based on the selection, the development platform may automatically add the include artifact in the "Customer Service Interaction site" being developed by the content provider.

Figure 4C:
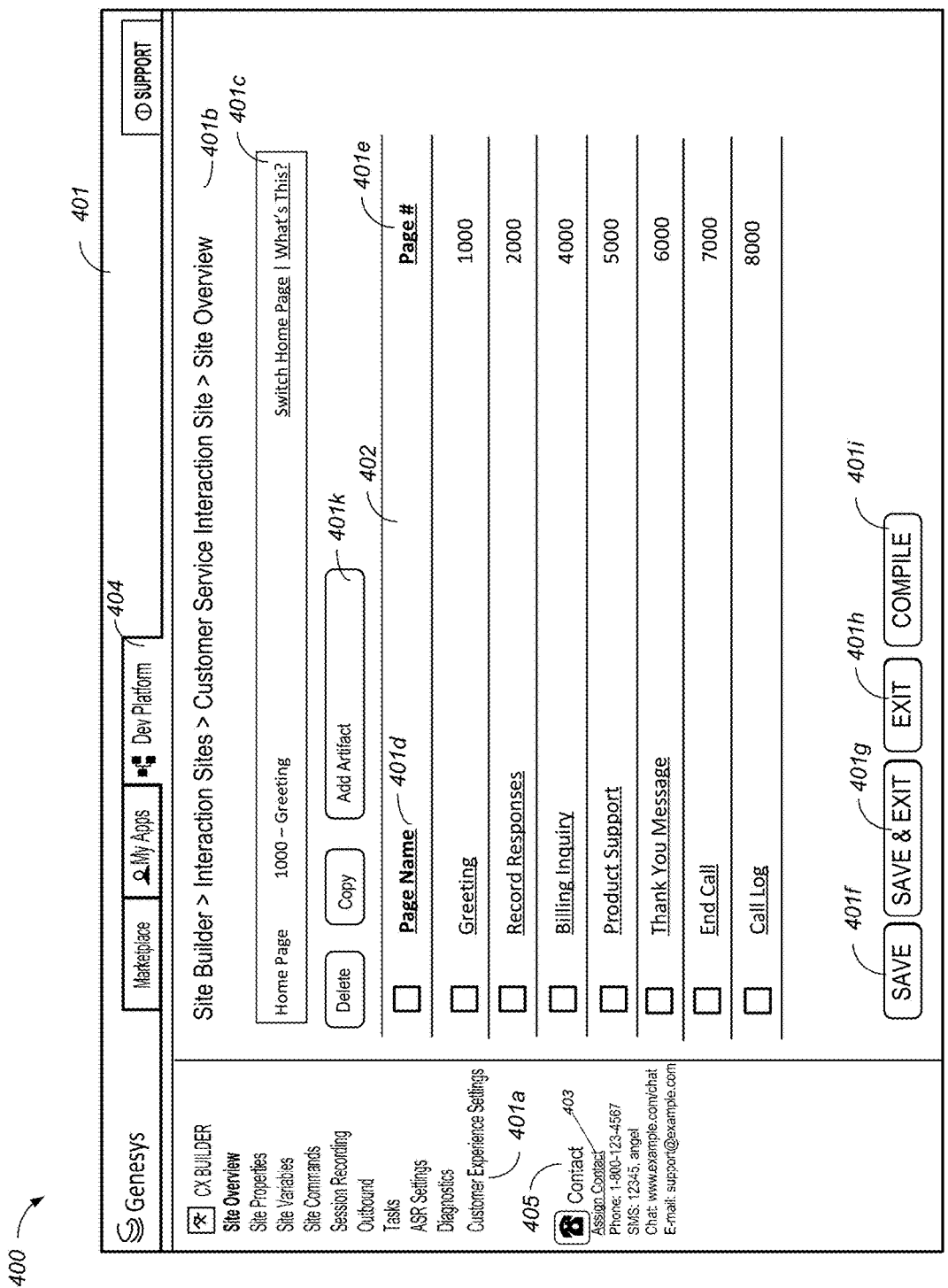

As shown by the GUI 242, the "Customer Experience Settings" is a process interface, i.e., it does not link to any interaction page or process page. When a process interface artifact is included in the interaction site, it may be represented by a link in the left panel 401a of the GUI 401. For example, as shown in FIG. 4C, a link to the "Customer Experience Settings" artifact is included in the panel 401a when the content provider adds the artifact to the interaction site.

Figure 4D:
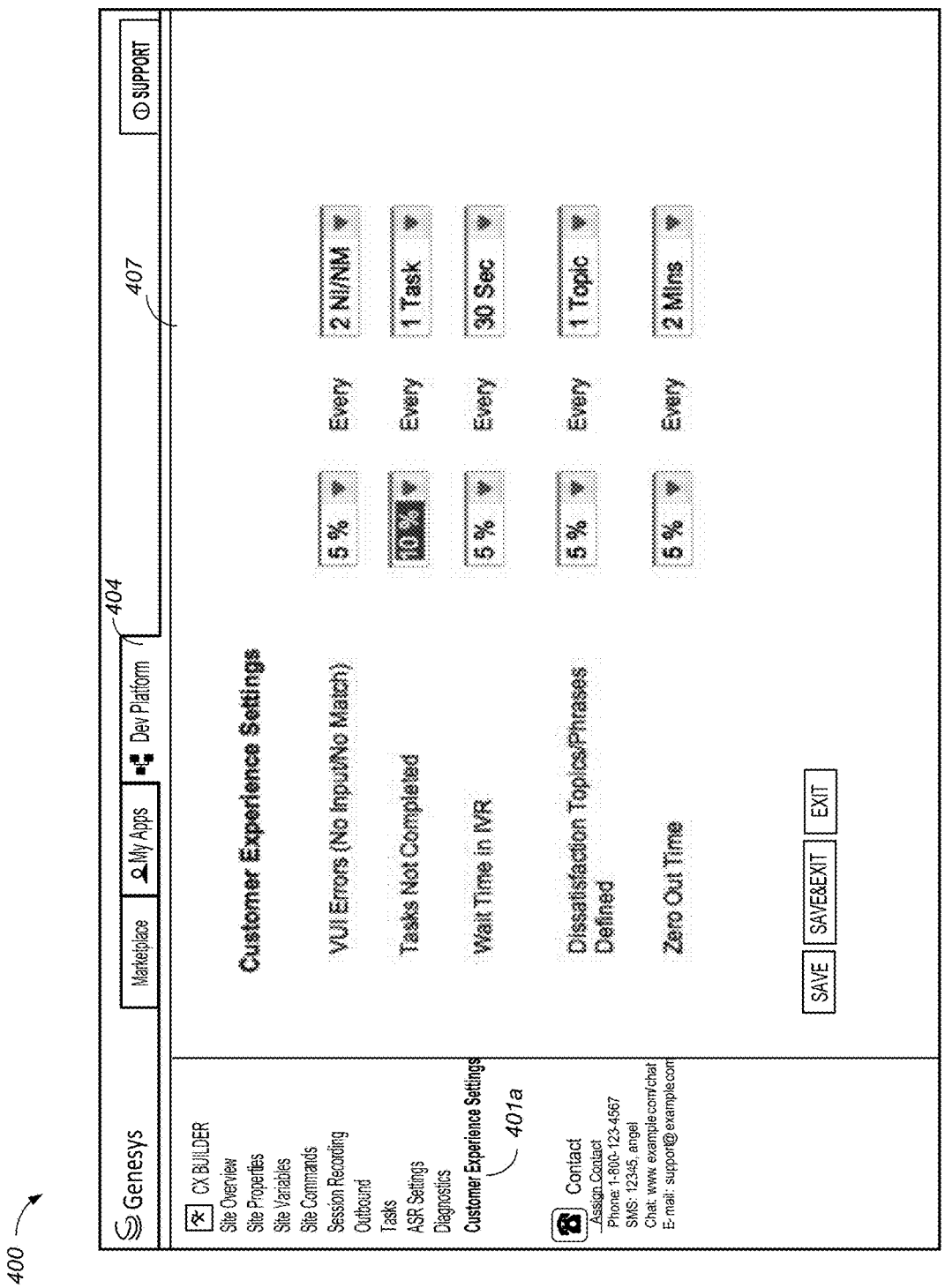

The content provider may access the process interface added to the instruction by selecting the link "Customer Experience Settings" from the left panel 401a under the "Dev Platform" tab 404. In some implementations, when the content provider selects the link "Customer Experience Settings" from the left panel 401a, the Customer Experience Settings process artifact is displayed by the GUI 407, as shown in FIG. 4D. This may be the case, for example, when a user interface is associated with the process interface artifact, as noted previously.

In some other implementations, when the content provider selects the link "Customer Experience Settings" from the left panel 401a, the Customer Experience Settings process artifact is displayed as source code by the GUI 409 of the application development platform, as shown in FIG. 4E. As noted previously, this may be the case, for example, if the Customer Experience Settings process artifact does not include a user interface. Alternatively, this may be the case when the content provider is interested in examining and/or modifying the source code for customizing the process artifact for specific needs of the interaction site.

Figure 4F:
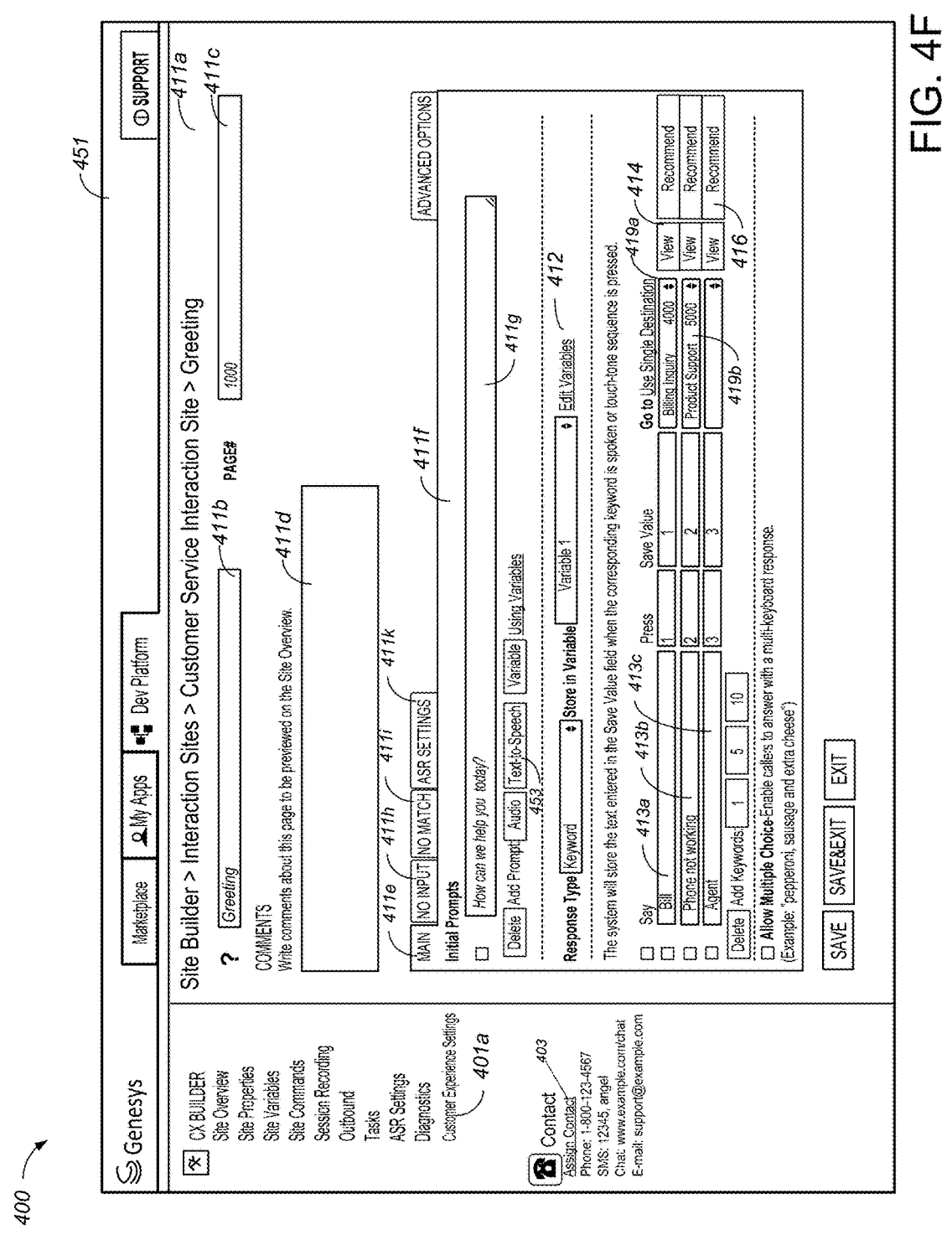

FIG. 4F illustrates an example GUI 451 for configuring an interaction page (specifically, a message page) that is processed for the interaction site when an end user accesses the interaction site during site operation. The interaction page shown may a template interaction page (e.g., a user interaction artifact downloaded from the marketplace) that includes one or more default parameters and one or more default values that correspond to the one or more default parameters, where the content provider may edit the parameters and the values as needed. The interaction page is identified by its page name 411b, i.e., "Greeting" page, and/or page number 411c. The page name 411b and the page number 411c correspond to the name of the page shown in the Page Name field 401d and the number of the page shown in the Page # field 401e respectively, shown in the Site Overview page 401.

The comments text box 411d allows the content provider to enter comments about the interaction page to be previewed on the Site Overview page 401. As shown, the interaction page corresponds to voice channel and the main tab 411e allows the content provider to enter parameters that configure the interaction page for the IVR channel. When the interaction page is executed during a communications session, the message specified in the "Initial Prompts" parameter 411g is delivered to the user.

The "Response Type" parameter 412 allows the content provider to specify what type of response the multichannel communications system 135 may expect the user to provide after the message is delivered. This allows the content provider to customize the resources to be used to process the received response. Fields 413a, 413b, and 413c correspond to keywords that the content provider may expect a user to say, after providing the user with the initial prompt. In the field 413a, the configured value is the keyword "Bill." If the user's response includes the keyword "Bill," the next destination 419a presented to the user will be the interaction page "Billing Inquiry," which corresponds to page # "4000," as indicated in the Page # field 401e shown in the Site Overview page 401. Similarly, in the field 413b, the content provider has configured the value is the key phrase "Phone not working." If the user's response includes this key phrase, then the next destination 419b presented to the user will be the interaction page "Phone Support," which corresponds to page # "5000," as indicated in the Page # field 401e shown in the Site Overview page 401. Lastly, by default, the field 413c is shown as having no default value.

The "View" button 414 allows the content provider to display a GUI on the content provider system 142 similar to the GUI 451 for configuring the page as specified in the destination page pull-down menu 419a. The "Recommend" button 416 allows the content provider to get recommended pages that can be selected as the next destination page 419a. For example, the content provider may configure the keyword "Agent" in the field 413c, and wish to view options for destination pages that correspond to this keyword. The content provider may click on the "Recommend" button 416 to view a list of recommended pages that may be used to connect the user to an agent at a call center.

Figure 4G:
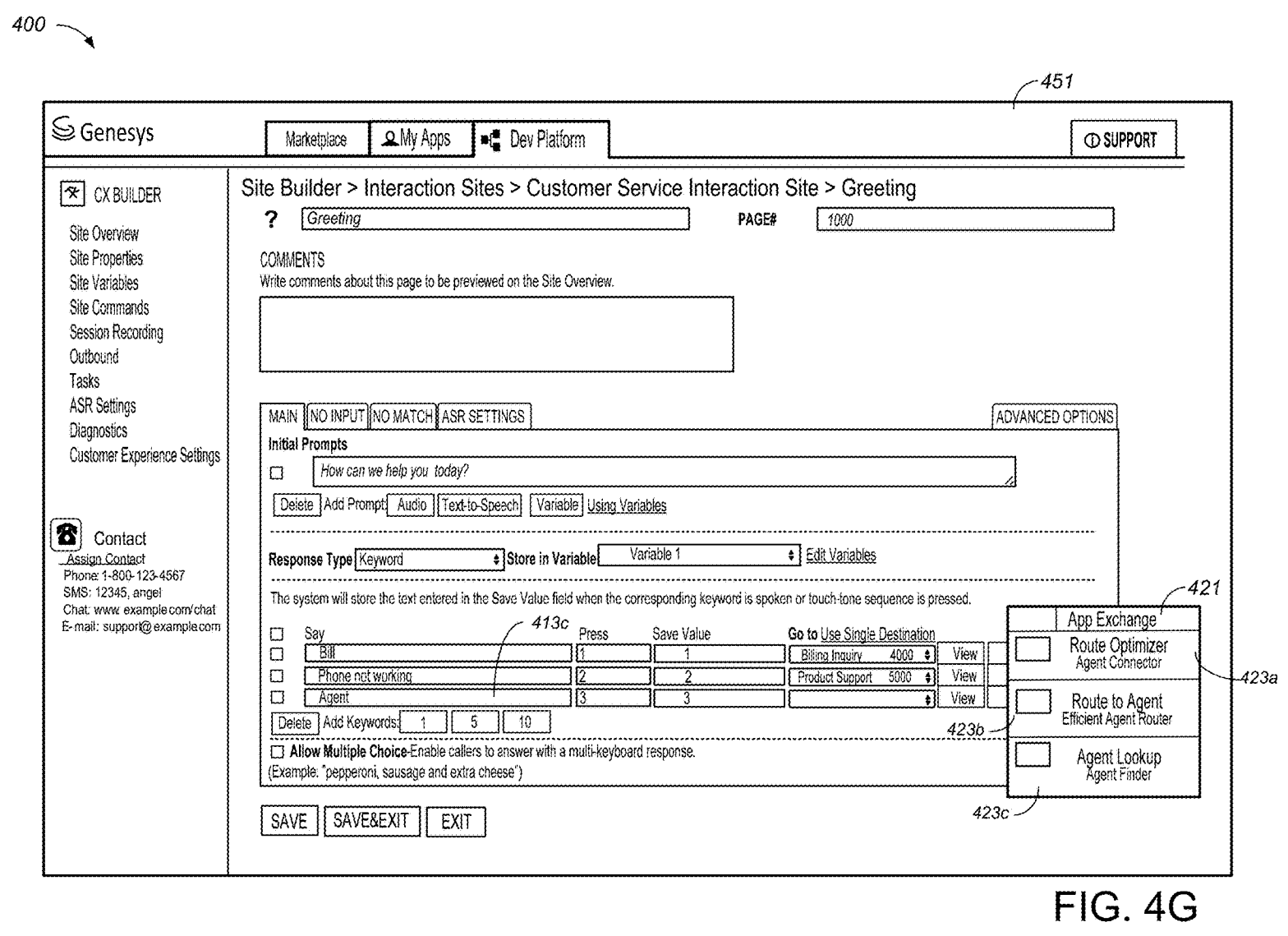

In response to the content provider clicking on the "Recommend" button 416, the application development platform displays a list 421 of recommended artifacts that may be provided by the recommendation engine 196, as shown in FIG. 4G. In some implementations, the list of recommended artifacts 421 may be dynamically obtained by the recommendation engine 196 based on updated values corresponding to one or more parameters associated with the interaction site or page that is being configured. For example, the parameter "Initial Prompt" has an updated value of "How can we help you today?" and the keyword response field 413c has been updated to include a value of "Agent." Based on these updated values, the recommendation engine 196 may submit a search and obtain a list of recommended artifacts 421 to be displayed on the GUI 451. Here, the list of recommended artifacts 421 includes three recommended process artifacts 423a, 423b, and 423c. However, in other implementations, the list of recommended artifacts 421 may include user interaction artifacts (e.g., interaction pages), or a combination of process artifacts and user interaction artifacts.

Figure 4H:
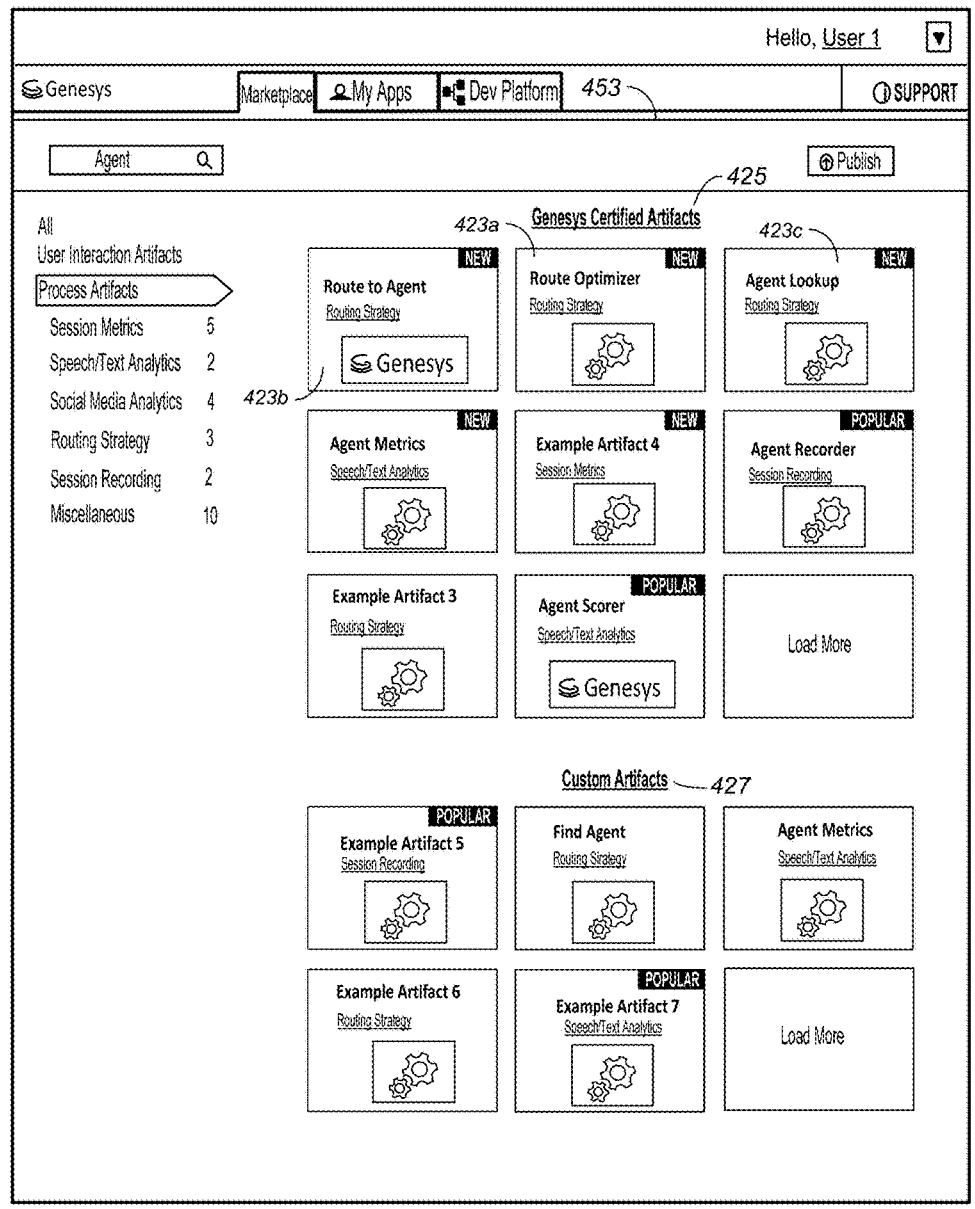
Figure 4I:
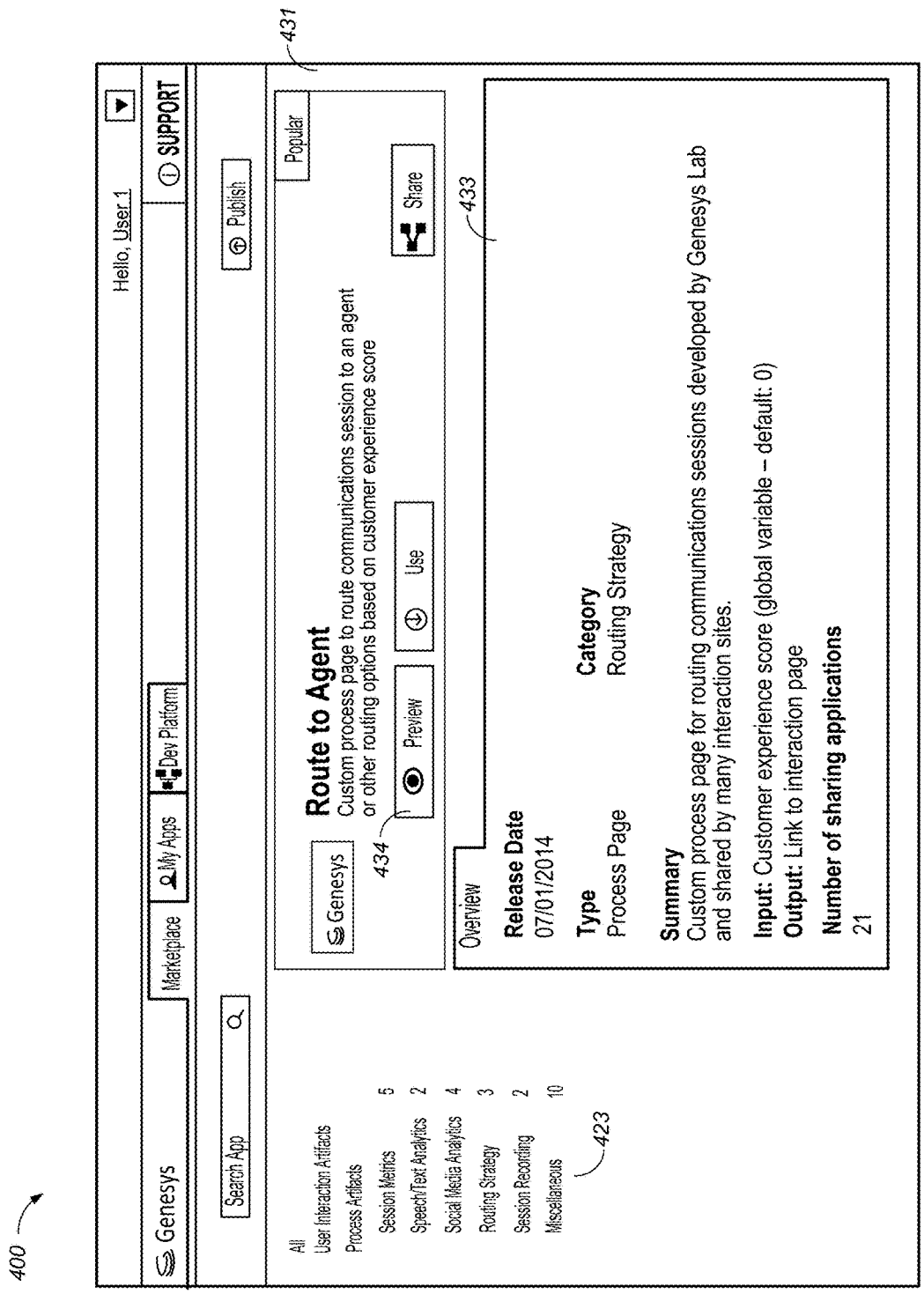

In some implementations, the content provider may preview the recommended artifacts before selecting one of them. In such implementations, the content provider may select the head of the list 421, e.g., "App Exchange," and in response the application development platform displays the marketplace of artifacts in the GUI 453, as shown by FIG. 4H. The GUI 453 shows process artifacts that are recommended to the content provider. The recommended process artifacts may include artifacts that are developed by the marketplace service provider, or tested/licensed by the service provider, e.g., grouped under "Genesys Certified Artifacts" 425. Additionally or alternatively, the recommended process artifacts may include artifacts that have been developed by other content providers/developers that may not have been tested and/or licensed by the marketplace service provider, e.g., grouped under "Custom Artifacts" 427.

The content provider may preview the recommended artifacts by selecting from the displayed thumbnail icons. For example, the content provider may preview the "Route to Agent" artifact by clicking on the icon 423b. Accordingly, details of the selected artifact may be presented to the content provider, as shown by the GUI 431 in the FIG. 4I. Similar to the GUI 242, the Overview section 433 of the selected process artifact may display information that allows the content provider to get a quick overview about the recommended process artifact. For example, the Overview section for the "Route to Agent" artifact displays the Release Date, the Type, the Category, a Summary of the artifact, and Input and Output parameters for the artifact. As shown, the Overview section 433 indicates that the "Route to Agent" process artifact is a process page in the "Routing Strategy" category of process artifacts. The process page uses "Customer experience score" as an input parameter and returns a link to an interaction page as an output.

In some implementations, the Overview section 433 also may display the number of other applications that currently use the process artifact. The Overview section 433 also may display statistics about the artifact (e.g., number of downloads, ratings, etc.).

Figure 4J:
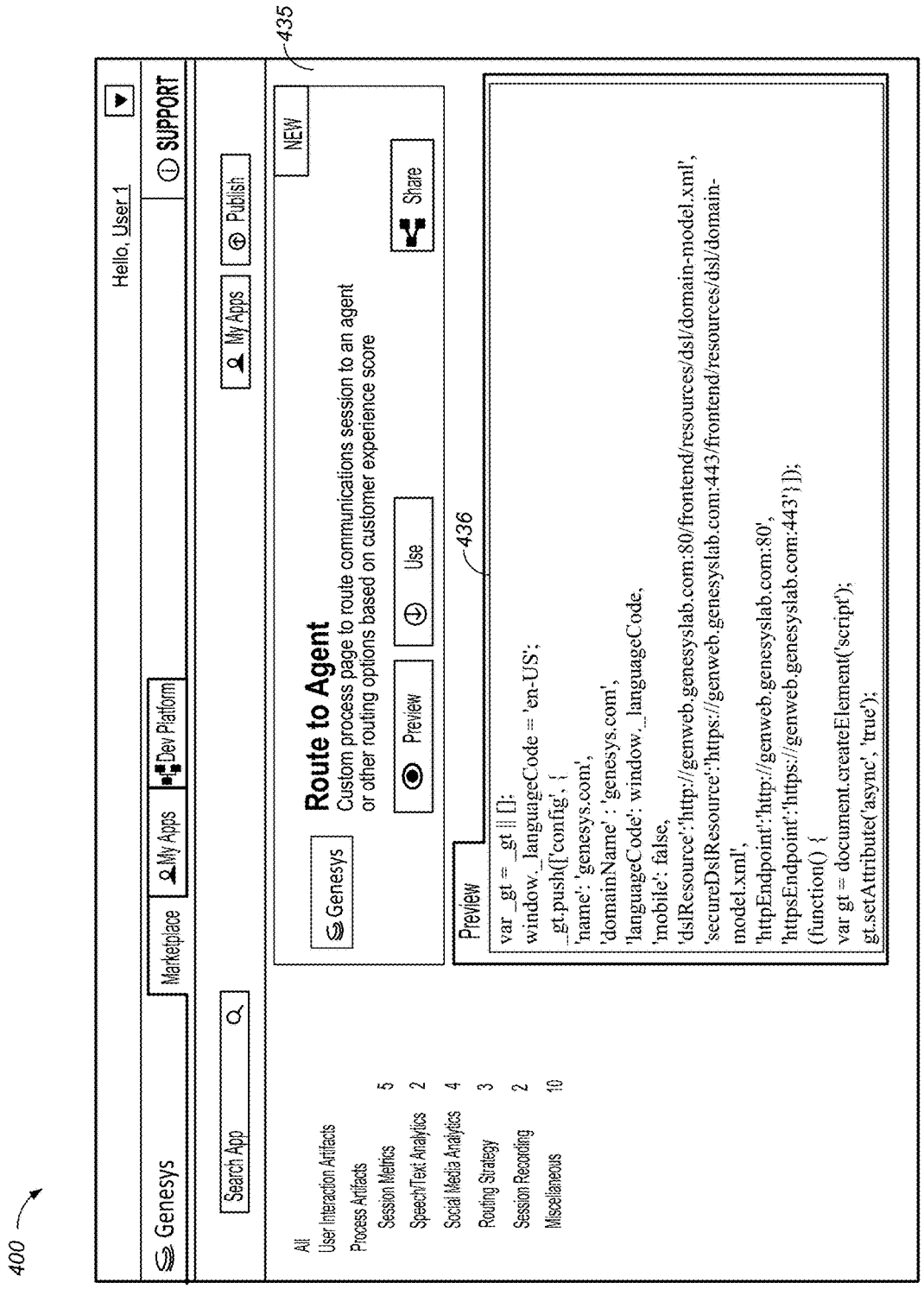

The content provider may preview the code or user interface for the process artifact by selecting the "Preview" button 434. In some implementations, when the content provider selects the "Preview" button 434, the GUI 435 is presented as shown in FIG. 4J, showing a code snippet for the process artifact in the preview section 436. The code snippet may be in SCXML or JavaScript, or some other suitable programming language.

Figure 4K:
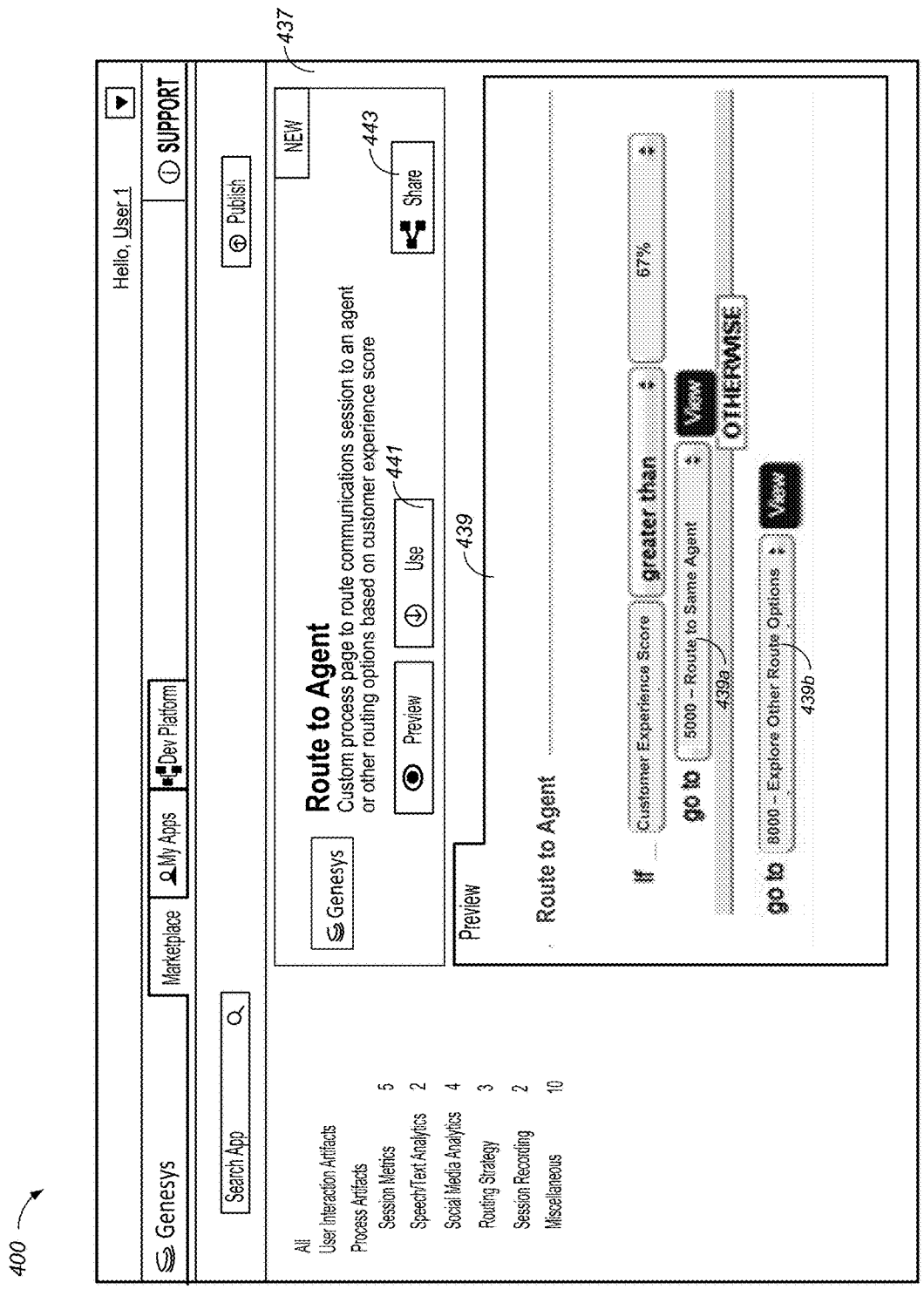

In some other implementations, when the content provider selects the "Preview" button 434, the GUI 437 is presented as shown in FIG. 4K, showing a user interface for the process artifact in the preview section 439. As noted previously, the "Route to Agent" process artifact is a process page. This is also demonstrated by the preview section 439, which shows that the process artifact includes links 439a and 439b to other pages, which may be either process pages or interaction pages. The "Route to Agent" process page will send the flow for the interaction site or application in which it is included to either of the pages linked by 439a or 439b based on executing the logic implemented in the process page.

The preview section 436 or 439 allows the content provider to get a more in-depth exposure to recommended process artifacts before selecting one of the recommended artifacts and applying the selected artifact to the interaction site or application being developed. If the content provider wishes to select the "Route to Agent" artifact being previewed and add this artifact to the interaction page, the content provider may click on the "Use" button 441. If the content provider wishes to share information about this artifact with another content provider or developer, the content provider may click on the "Share" button 443.

Figure 4L:
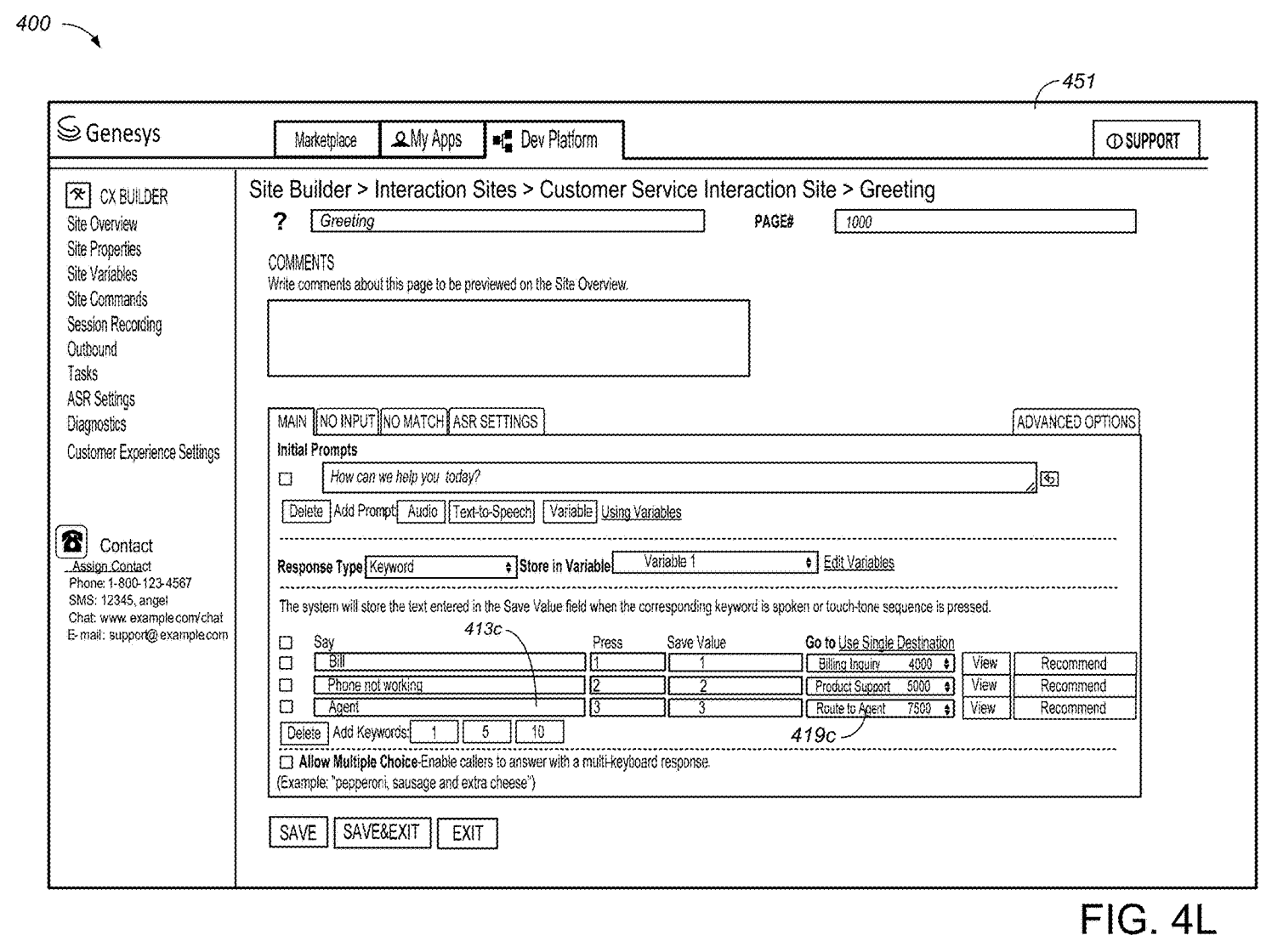

FIG. 4L shows that in response to the content provider selecting the "Route to Agent" process artifact 423b from the list of the recommended artifacts 421, e.g., by selecting the "Use" button 441 from the GUI 437, the value for the destination 419c corresponding to the keyword 413c in the interaction page GUI 451 is updated to show "Route to Agent" as the destination page. In addition, since "Route to Agent" is a process page, a new page number 7500 is assigned to the process page "Route to Agent." In some implementations, the template process page "Route to Agent" may be configured by the content provider by clicking the "View" button after the artifact has been added to the interaction site or application being developed by the content provider.

Figure 4M:
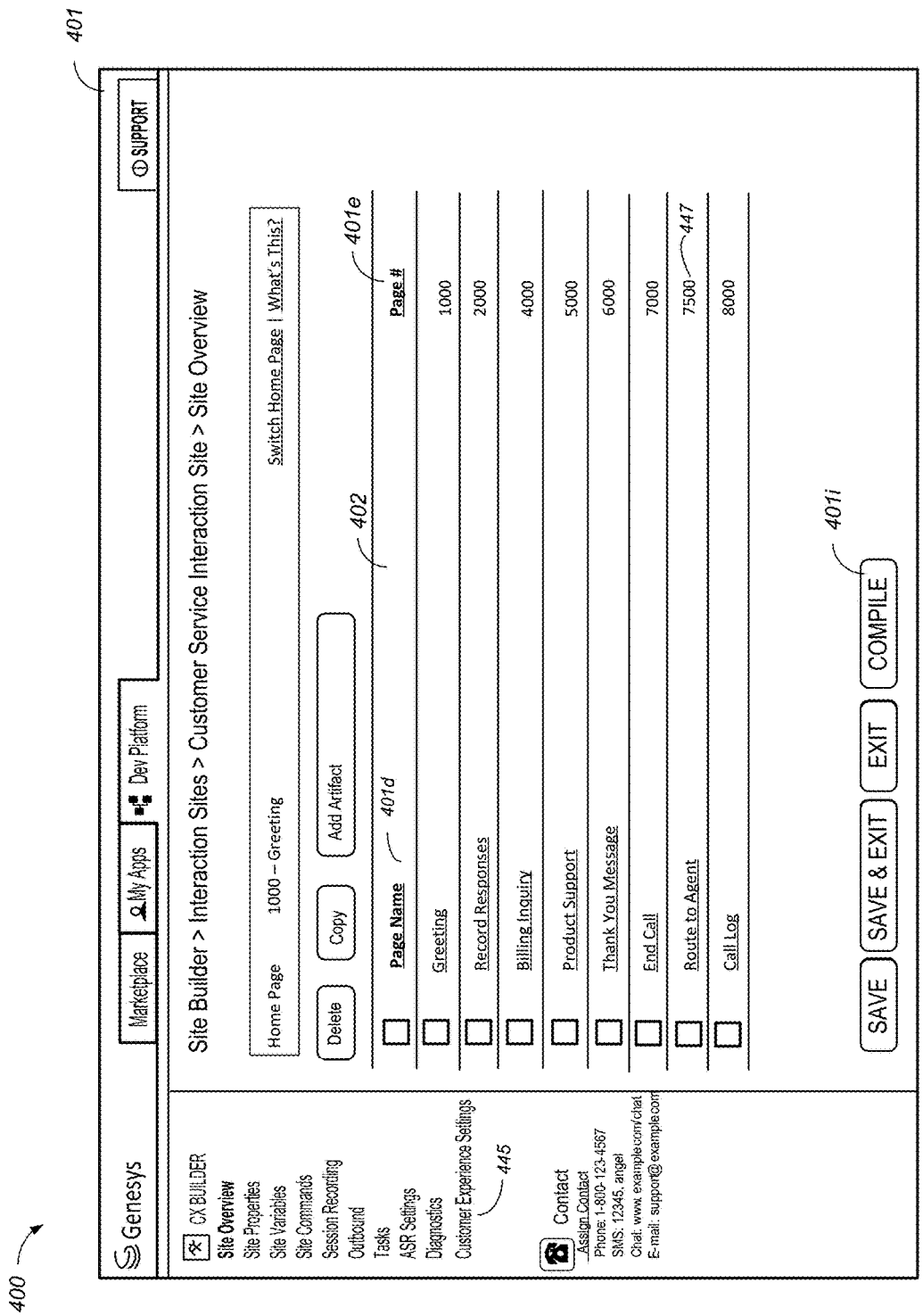

FIG. 4M illustrates an example GUI 401 of an updated interaction site overview page 401. As described above, the content provider has added two process artifacts, "Customer Experience Settings" and "Route to Agent" to the template interaction site. "Customer Experience Settings" is a process interface and a link 445 to the process interface is provided in left panel of the GUI 401. On the other hand, "Route to Agent" is a process page, and a link 447 to the process page is provided in the page interaction flow 402. The corresponding page names and page numbers are updated in the Page Name field 401d and the Page # field 401e, respectively. The content provider may compile the updated interaction site by clicking the "Compile" button 401i, where the application compiler 194 may compile the process artifacts and user interaction artifacts along with the input parameters into an interaction flow document, and may save the interaction flow document in the interaction flow document database 185.

The examples describe above are not limiting. A GUI for developing an interaction site or other application used in a multichannel communications environment may have more or fewer configurable parameters than the GUIs described in FIGS. 4A-4M. Other types of interaction pages, process pages and process interfaces may similarly be used to configure parameters for multiple different communications channels and/or other applications. For example, question pages and multimodal action pages may present configurable parameters that include common parameters generic to all communications channels and, in some implementations, may additionally include channel-specific parameters. In some implementations, some page types, such as, for example, logic pages and transaction pages, are always generic to all communication channels. In other implementations, logic pages and transaction pages include configurable parameters that are generic to all communications channels and also include configurable parameters that are channel-specific.

Figure 5:
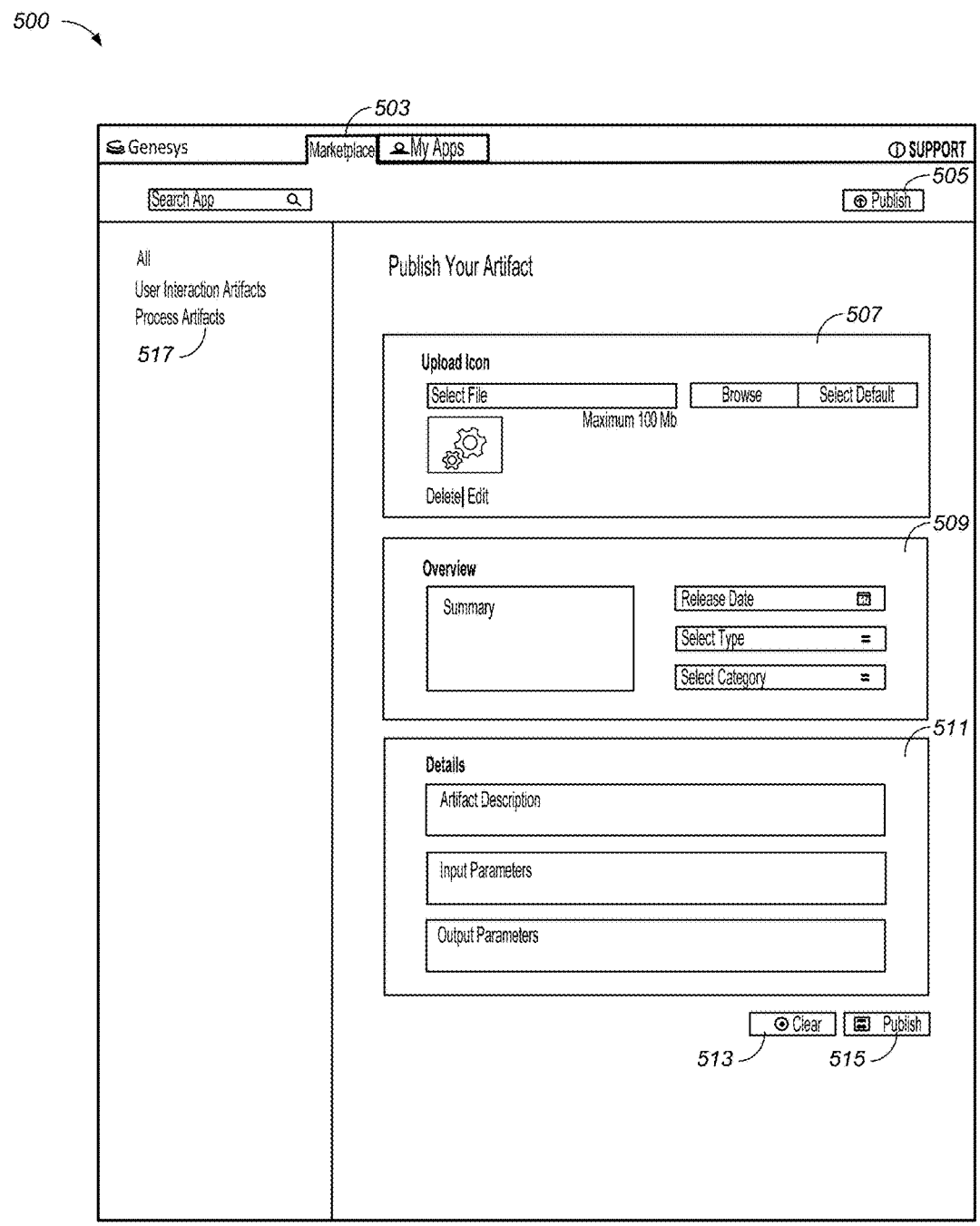
FIG. 5 illustrates a GUI for an application development platform that is used by a content provider to publish an artifact to the application development platform.

FIG. 5 illustrates a GUI 500 for an application development platform that is used by a content provider to publish an artifact to the application development platform. In general, after the content provider has successfully designed an artifact (e.g., a process artifact or an user interaction artifact), the content provider may share the artifact with the other content providers or developers. To publish an artifact, the content provider may access the GUI 500 by selecting the "Marketplace" tab 503, and then clicking on the "Publish" button 505.

In the GUI 500, the "Upload Icon" section 507 enables the content provider to browse, add, and/or delete an image associated with the artifact. For example, the content provider may add an icon associated with the artifact. When published in the marketplace, other content providers may view the artifact similar to that described in FIG. 2A.

The "Overview" section 509 enables the content provider to add overview information about the artifact. For example, the content provider may add information related to a summary or brief description, release date, artifact type and artifact category. The artifact type may be one of user interaction artifact (e.g., for interaction pages or interaction sites) or process artifacts (e.g., for process interfaces or process pages). The category may further specify the artifact for the selected type. For example, as noted previously, in some implementations a process artifact may be categorized into one or more of "Session Metrics," "Speech/Text Analytics," "Social Media Analytics," "Routing Strategy," "Session Recording," and "Miscellaneous." When published in the marketplace, other content providers may view the artifact in a manner similar to that described in FIG. 2B.

The "Details" section 511 enables the content provider to add detailed information about the artifact. For example, the content provider may add information related to artifact description, input parameters and output parameters associated with the artifact. When published in the marketplace, other content providers may view the artifact similar to that described in FIG. 2C.

The "Clear" button 513 enables the content provider to clear the entered content in sections 507, 509, and 511. The "Publish" button 515 enables the content provider to publish the artifact in the marketplace for others to browse, search, and download.

In some implementations, when the content provider publishes an artifact to the marketplace, the artifact is checked by the marketplace service provider before it is made available in the marketplace for others to browse, search, and download. For example, the service provider may check whether the artifact performs correctly and returns results as described, or whether there are any performance issues, such as memory leakage, repeated crashes, among others. The marketplace provider also may check whether the artifact has security issues, e.g., whether the artifact includes malicious code that may adversely affect applications in which the artifact is used. In some implementations, even if the artifact does not itself include malicious code, the artifact may have other security issues that may be exploited by malicious software, e.g., the artifact code may result in buffer overflows that may lead to security weaknesses that can be exploited. The marketplace service provider may check these and various other performance and security issues before determining whether to allow the artifact to be made available on the marketplace, or whether to reject the artifact and return to the developer for correcting issues with the artifact. In some implementations, after an artifact has been checked by the service provider and approved for publication in the marketplace, the artifact may be marked as being a certified artifact.

The examples describe above are not limiting. A GUI for uploading an artifact used in a multichannel communications environment may have more or fewer configurable parameters than the GUI 500.

Figure 6A:
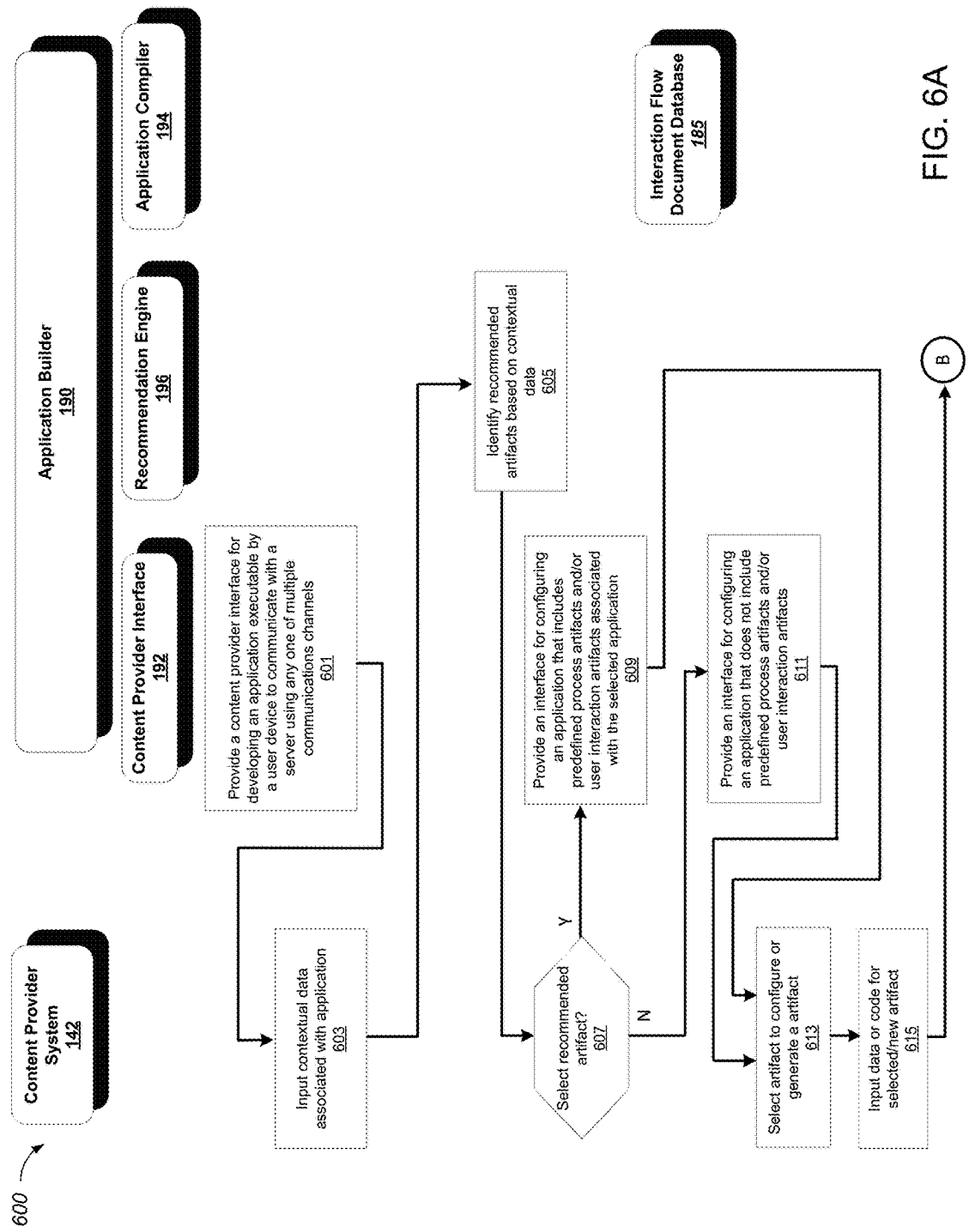
FIGS. 6A and 6B are flow charts illustrating an example of a process for a content provider to design and implement an application.
Figure 6B:
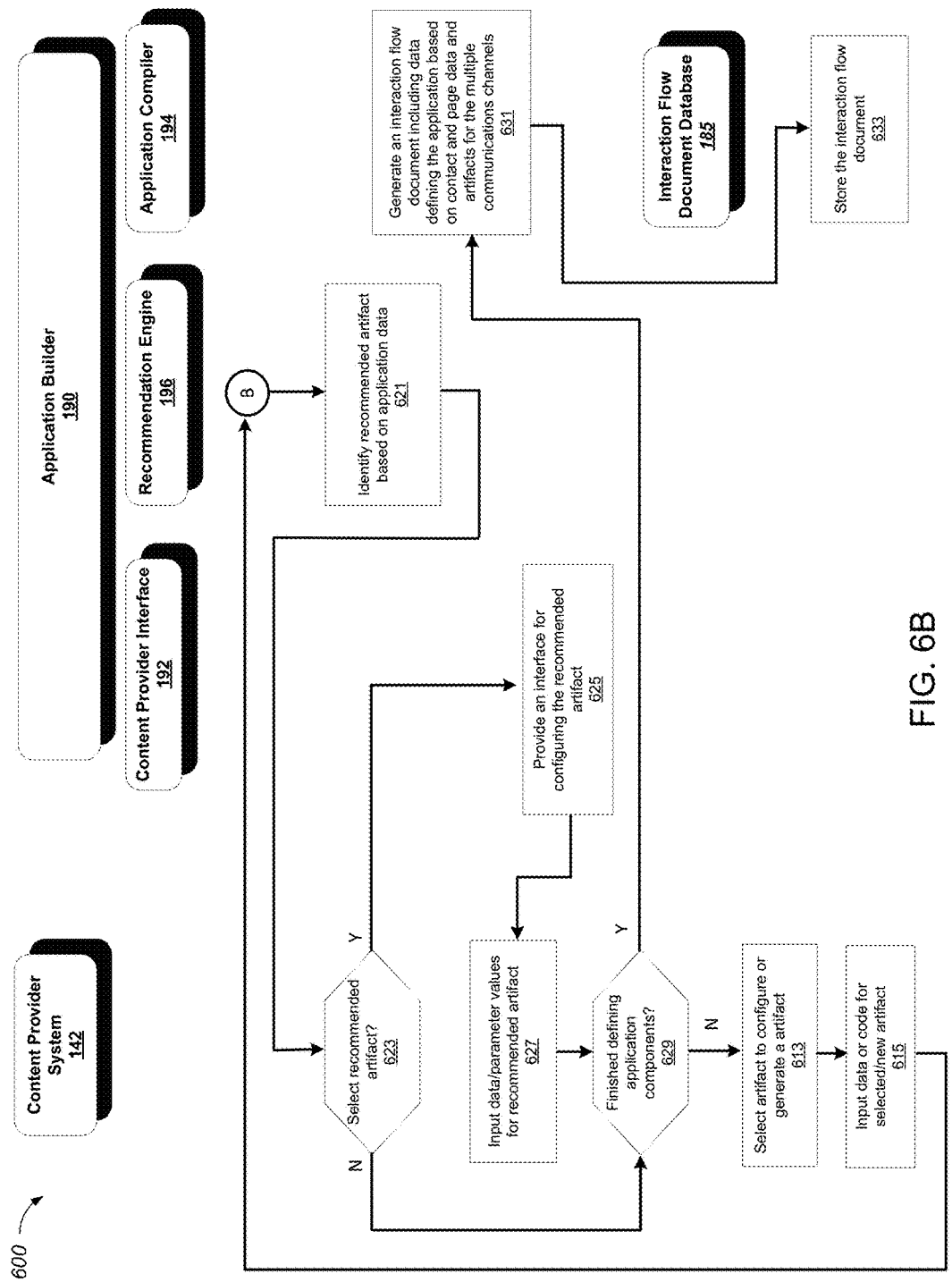

FIGS. 6A and 6B are flow charts illustrating an example of a process 600 for a content provider to design and implement an application. For example, the content provider may create and host an interaction site using the process 600. In general, the process 600 provides a content provider an application development environment that recommends artifacts for use in applications developed by the content provider, e.g., process artifacts and user interaction artifacts for designing and creating an interaction site that may be accessed in a multichannel solution platform. The process 600 may be performed by a computer system comprising one or more computers, and the following section describes the process 600 as being performed by components of the system 100. However, the process 600 also may be performed by other systems or system configurations.

Referring to FIG. 6A, the application builder 190 provides to the content provider system 142a content provider interface for developing an application executable by a user device to communicate with a server using any one of multiple communications channels (601). The application may be, for example, a contact center application such as an interaction site. The application builder 190 may include a content provider interface 192. The content provider interface 192 is a GUI front-end for an application development tool that can be used to build an interaction site that is capable of handling interactions using multiple communications channels. The content provider may access the content provider interface 192 over the data network 130.

The content provider system 142 inputs contextual data associated with the application (603). For example, the content provider may input contextual data for each of the enabled multiple communications channels. The application builder 190 may provide a GUI similar to the GUI 201 in FIG. 2B, which allows the content provider to input a search query and search for a template process artifact, such as a template customer experience settings artifact. As another example, the application builder 190 may provide a GUI that prompts the content provider to answer a number to predetermined questions to determine the context of the application.

The application builder 190 identifies one or more recommended artifacts based on contextual data (605). The application builder 190 may include a recommendation engine 196. For example, the application builder 190 may provide a GUI similar to the GUI 201 in FIG. 2B, which displays recommended process artifacts 219 to the content provider.

The content provider system 142 determines whether an artifact is selected from the recommended artifacts (607). If the content provider system 142 selects an artifact from the recommended artifacts, the application builder 190 provides an interface for configuring an application that includes predefined process artifacts and/or user interaction artifacts associated with the selected application (609). For example, the application builder 190 may provide a GUI similar to the GUI 401 in FIGS. 4A-4M, which enables the content provider to configure an interaction site with recommended artifacts. If the content provider system 142 does not select an artifact from the recommended artifacts, the application builder 190 provides an interface for configuring an application that does not include predefined process artifacts and/or user interaction artifacts (611).

The content provider selects an artifact to configure, or generate a new artifact (613). For example, in FIG. 4H, the content provider may select any one of the process artifacts displayed in the GUI 453 to configure a predefined artifact, or create a new artifact. The content provider inputs data or code for the selected or new artifact (615). For example, the application builder 190 may provide a GUI similar to the GUI 431 in FIG. 4J, which may enable the content provider to modify the input/output parameters or API calls for the selected process artifact.

Referring to FIG. 6B, the application builder 190 identifies recommended artifacts based on application data (621). The application builder 190 may include a recommendation engine 196. For example, the application builder 190 may provide a GUI similar to the GUI 451 in FIG. 4G, which enables the content provider to obtain a list 421 of recommended artifacts from the recommendation engine 196. In some implementations, the recommendation engine 196 obtains the list 421 of recommended artifacts based on one or more values corresponding to one or more parameters associated with the application, e.g., template interaction page, that is being configured.

The content provider system 142 determines whether an artifact is selected from the recommended artifacts (623). For example, the content provider may select any one of the three artifacts 423a, 423b, or 423cc by clicking on the corresponding icon in the GUI 451 in FIG. 4G.

If the content provider system 142 selects an artifact from the recommended artifacts, the application builder 190 provides an interface for configuring the recommended artifact (625). The content provider inputs data and/or parameter values for the recommended artifact (627). After the content provider inputs values for the parameters of the recommended process artifact, or if the content provider system 142 does not select an artifact from the recommended artifacts, the content provider system 142 determines whether the content provider has finished defining components of the application (629). For example, the application may be an interaction site and the content provider system 142 checks whether the content provider has finished defining interaction pages for the site. Notably, while not explicitly shown in FIG. 6B, the input parameters for the recommended process artifact also may trigger additional process artifact recommendations in some implementations. This may be the case, for example, when values of the input parameters for the recommended process artifact are based on output parameters of some other process artifact. In a similar manner, the input of page data for recommended interaction pages may trigger additional interaction page recommendations in some implementations.

If the content provider has not finished defining the components of the application, the content provider selects an artifact from among the application's existing artifacts to configure or generates a new artifact (613), as noted previously. On the other hand, if the content provider has finished defining the components of the application, then the application builder 190 generates an interaction flow document including data defining the application based on the contact and page data and artifacts for the multiple communications channels (631). The application builder 190 may include an application compiler 194. In some implementations, the application builder 190 may generate an interaction flow document, which may include XML, SCXML and Java code that correspond to interaction pages, process pages and process interfaces of an interaction site created by the content provider via the content provider interface.

The application builder 190 then stores the interaction flow document at the interaction flow document database 185 (633). The interaction flow document database 185 stores interaction flow documents created by the application builder 190, and provides the interaction flow processor 180 access to these interaction flow documents.

Figure 7:
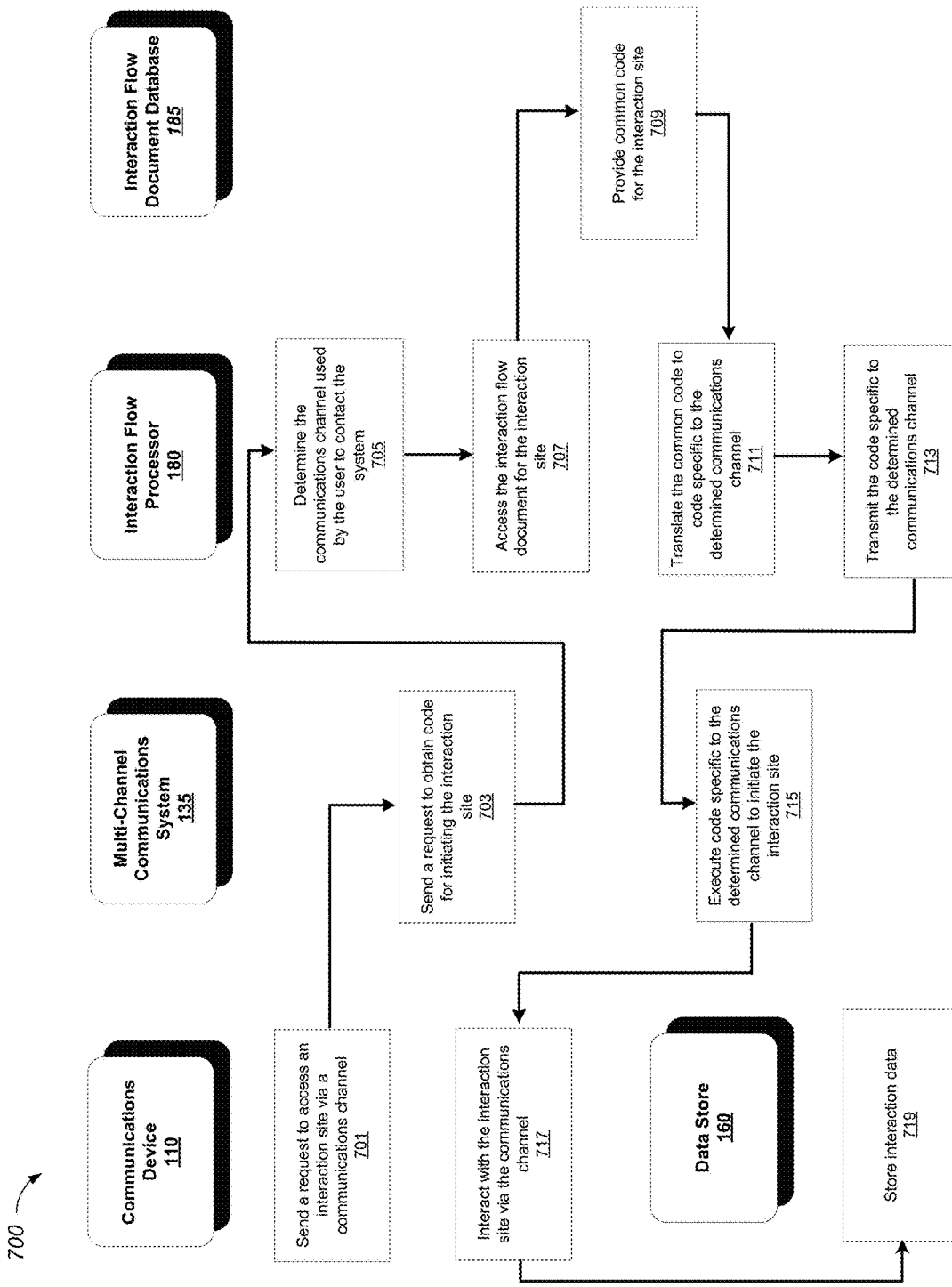
FIG. 7 is a flow chart illustrating an example of a process for a user to communicate with a multichannel communications system and access an interaction site via a communications channel.

FIG. 7 is a flow chart illustrating an example of a process 700 for a user to communicate with a multichannel communications system and access an interaction site via a communications channel. In general, the process 700 provides a communications device access to an interaction site using a communications channel of a user's choice. The process 700 may be performed by a computer system comprising one or more computers, and the following section describes the process 700 as being performed by components of the system 100. However, the process 700 also may be performed by other systems or system configurations.

The communications device 110 sends a request to access an interaction site via a particular communications channel (701). A user of the communications device (e.g., a smart phone) 110 is able to interact with the communications device 110 to request a service from an interaction site that is provided by a content provider using a communications channel. For example, the user may indicate a desire to request a service by contacting the multichannel communications system 135 in any of multiple different ways. For example, the user may call a telephone number, send an SMS message, enter into a chat session, or send an email.

The multichannel communications system 135 receives the request from communications device 110, and sends a request to the interaction flow processor 180 to obtain code for initiating the interaction site (703). Depending on the communications channel the communications device 110 is using, the request is received by a handling system in the multichannel communications system 135. For example, if the user of the communications device 110 calls a phone number to reach the interaction site, the call handling system 150 will receive the phone call. Based on the contact information received by the multichannel communications system 135, the corresponding handling system sends a request to the interaction flow processor 180 for the scripts for executing the interaction site. The request sent by the multichannel communications system 135 to the interaction flow processor 180 may include an interaction site identifier (e.g., a unique interaction site identifier) that may be used by the interaction flow processor 180 to identify the desired interaction site. In some implementations, the multichannel communications system 135 may send a request for the scripts for executing the entire flow of the interaction site. In other implementations, the multichannel communications system 135 may send a request for the scripts for executing a particular state of the flow (e.g., a state corresponding to executing a single page or executing a subset of the pages of the interaction site), rather than the entire flow.

The interaction flow processor 180 identifies the communications channel used by the user to contact the system (705). In some implementations, the communications channel may be included in the request sent by the multichannel communications system 135. In some implementations, the communications channel may be determined by the interaction flow processor 180 based on the identifier of the handling system. For example, the identifier may be an IP address of the handling system. As another example, the identifier may be metadata embedded in the request to the interaction flow processor 180.

The interaction flow processor 180 accesses the interaction flow document for the interaction site (707). Based on the interaction site that the multichannel communications system 135 has requested, the interaction flow processor 180 accesses the interaction flow document stored in the interaction flow document database 185. The interaction flow document database 185 then provides the common code for the interaction site (709). In some implementations, the common code may be XML, SCXML or Java code.

The interaction flow processor 180 translates the common code to code specific to the determined communications channel (711). Based on the communications channel that the communications device 110 is using, the interaction flow processor 180 translates some of the scripts in the interaction flow document to a specific language that the handling system can execute. For example, if the handling system is the call handling system 150, the interaction flow processor 180 translates scripts corresponding to interaction pages from XML to VoiceXML scripts. In some implementations, the translation may include adding parameters specific to a type of communications channel in the translated scripts. For example, if the handling system is the call handling system 150, the interaction flow processor 180 may add information specific to ASR resource selection in the translated scripts. However, code corresponding to process artifacts that do not interact with the user may not be translated and may be executed in native form, e.g., as executable Java code. The interaction flow processor 180 then transmits the translated code that is specific to the determined communications channel to the multichannel communications system 135 (713).

The multichannel communications system 135 executes code specific to the determined communications channel to initiate the interaction site between the multichannel communications system 135 and the communications device 110 (715). The communications device 110 then interacts with the interaction site via the communications channel (717). Notably, if the interaction site is an enhanced interaction site (i.e., a site that includes one or more multimodal action pages), the communication device 110 may interact with the interaction site via the standard communications mode (e.g., text) of the communications channel (e.g., chat) and, in at least some portions of the interaction flow, via one or more additional communication modes (e.g., video and audio). As stated previously, multimodal action pages are described in greater detail in application Ser. No. 13/092,090, which is incorporated herein by reference for all purposes.

The communications device 110 transmits interaction data to the data store 160, and the data store 160 stores the interaction data (719). In some implementations, the recommendation engine 196 may access the interaction data to recommend artifacts to content providers. For example, the recommendation engine 196 may recommend process artifacts for measuring call drops and user interaction artifacts that satisfy a certain call drop threshold. As another example, the recommendation engine 196 may recommend process artifacts for measuring customer experience scores and interaction sites that satisfy a certain customer satisfaction threshold.

Figure 8A:
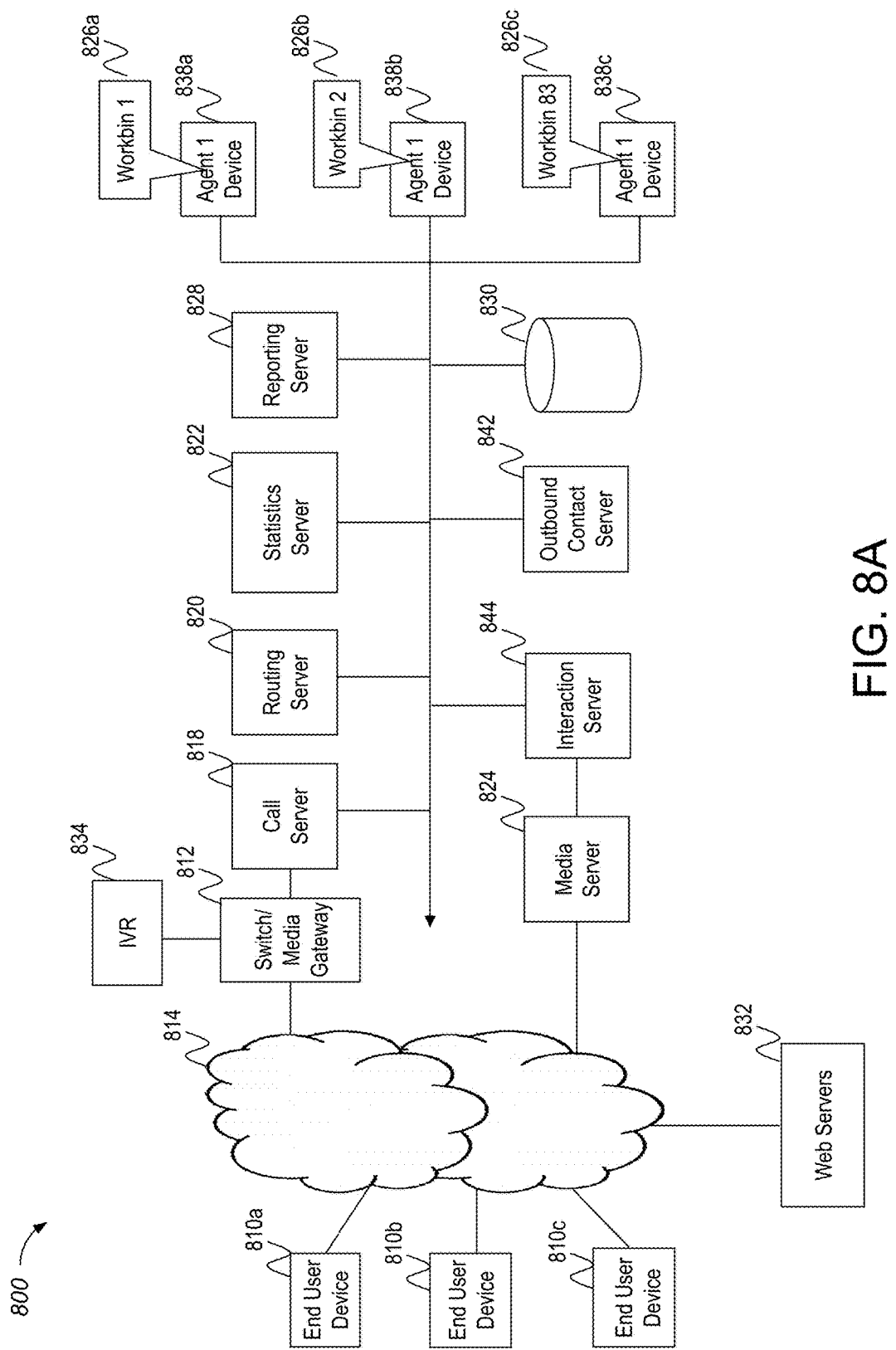
FIG. 8A is a schematic block diagram of an example system supporting a contact center that routes incoming and outgoing customer activities to customer service agents using applications implementing process artifacts.

FIG. 8A is a schematic block diagram of an example system 800 supporting a contact center that routes incoming and outgoing customer activities to customer service agents using applications implementing process artifacts. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

In some implementations, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users desiring to receive services from the contact center may initiate inbound interactions with the contact center via their end user devices 810*a*-810*c* (collectively referenced as 810). Each of the end user devices 810 may be a communication device conventional in the art, such as, for example, a telephone, wireless phone, smart phone, personal computer, electronic tablet, and/or the like. Users operating the end user devices 810 may initiate, manage, and respond to telephone calls, emails, chats, text messaging, web-browsing sessions, and other multi-media transactions.

Inbound and outbound interactions from and to the end users devices 810 may traverse a telephone, cellular, and/or data communication network 814 depending on the type of device that is being used. For example, the communications network 814 may include a private or public switched telephone network (PSTN), local area network (LAN), private wide area network (WAN), and/or public wide area network such as, for example, the Internet. The communications network 814 may also include a wireless carrier network including a code division multiple access (CDMA) network, global system for mobile communications (GSM) network, and/or any 3G or 4G network conventional in the art.

In some implementations, the contact center includes a switch/media gateway 812 coupled to the communications network 814 for receiving and transmitting calls between end users and the contact center. The switch/media gateway 812 may include a telephony switch configured to function as a central switch for agent level routing within the center. In this regard, the switch 812 may include an automatic call distributor, a private branch exchange (PBX), an IP-based software switch, and/or any other switch configured to receive Internet-sourced calls and/or telephone network-sourced calls. In some implementations, the switch is coupled to a call server 818 which may, for example, serve as an adapter or interface between the switch and the remainder of the routing, monitoring, and other call-handling systems of the contact center.

The contact center may also include a multimedia/social media server 824 for engaging in media interactions other than voice interactions with the end user devices 810 and/or web servers 832. The media interactions may be related, for example, to email, vmail (voice mail through email), chat, video, text-messaging, web, social media, screen-sharing, and the like. The web servers 832 may include, for example, social interaction site hosts for a variety of known social interaction sites to which an end user may subscribe, such as, for example, Facebook™, Twitter™, LinkedIn™, Pinterest™, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

In some implementations, the switch is coupled to an IVR server 834. The IVR server 834 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the incoming interaction, also referred to as incoming customer activity, is to be routed to an agent, the call server 818 will interact with a routing server 820 for finding the most appropriate agent for processing the incoming activity. The call server 818 may be configured to process PSTN calls, VoIP calls, and the like. For example, the call server 818 may include a session initiation protocol (SIP) server for processing SIP calls. In some implementations, the call server 818 may, for example, extract data about the customer interaction such as callers telephone number, often known as the automatic number identification (ANI) number, or the customer's internet protocol (IP) address, or email address.

In some implementations, the call server 818 may also query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 830. The call server 818 may query the customer information from the customer database via an ANI or any other information collected by the IVR 834, Media Server 824 or other. The information may then be relayed to the agent device 838 of the agent who is processing the call.

In one example, while an agent is being located and until such agent becomes available, the call server 818 may place an incoming customer activity in, for example, a customer activity queue. The activity queue may be implemented via any data structure conventional in the art, such as, for example, a linked list, array, and/or the like. The data structure may be maintained, for example, in buffer memory provided by the call server 818.

Once an appropriate agent is available to handle a customer activity, the activity may be removed from the customer activity queue and transferred to a corresponding agent device 838*a*-838*c* (collectively referenced as 838). Collected information about the customer and/or the customer's historical information from the customer database may also be provided to the agent device for aiding the agent in better servicing the call. In this regard, each agent device 838 may include a telephone adapted for regular telephone calls, VoIP calls, and the like. The agent device 838 may also include a computer for communicating with one or more servers of the contact center and performing data processing associated with contact center operations and for interfacing with customers via a variety of communication mechanisms such as chat, instant messaging, voice calls, and the like The selection of an appropriate agent for routing an inbound or outbound customer activity may be based, for example, on a routing strategy employed by the routing server 820, and based on information about agent availability, skills, preferences, and other routing parameters provided, for example, by a statistics server 822.

In some implementations, the media servers 824 may be configured to detect user presence on different websites including social media sites, and may also be configured to monitor and track interactions on those websites.

The contact center may also include a reporting server 828 configured to generate reports from data aggregated by the statistics server 822. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

In some implementations, the routing server 820 is enhanced with functionality for managing back-office/offline activities that are assigned to the agents. Once assigned to an agent, an activity may appear in the agent's workbin 826a-826c (collectively referenced as 826) as a task to be completed by the agent. The agent's workbin may be implemented via any data structure conventional in the art, such as, for example, a linked list, array, and/or the like. The workbin may be maintained, for example, in buffer memory of each agent device 838. The activity may also be pushed to the agent device via, for example, a pop-up message, for acceptance or refusal in real time.

In some implementations, in addition to storing agent preference data, the mass storage device 830 also stores data related to contact center operation such as, for example, information related to agents, customers, customer activities, and the like. The mass storage device may take form of a hard disk or disk array as is conventional in the art.

In some implementations, the system also includes an outgoing contact server (OCS) 842 for scheduling, initiating, and/or managing, outgoing interactions. For example, the OCS may store an outgoing contact list and may interface with the routing server 820 to enable an agent to partake in an outgoing activity to, for example, upsell current customers, solicit new businesses, seek donations for charitable organizations, or reach out to customers who have requested technical assistance. In some implementations, the OCS 842 may further interact with the IVR 834 for placing outgoing calls.

The various servers of FIG. 8A may each include one or more processors executing computer program instructions and interacting with other system components for performing the various functionalities described herein. The computer program instructions may include functions implemented using one or more process artifacts that are downloaded from a marketplace of artifacts, e.g., the marketplace shown in FIG. 2B.

The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art will recognize that the functionality of various servers may be combined or integrated into a single server, or the functionality of a particular server may be distributed across one or more other servers without departing from the scope of the embodiments of the present invention.

Figure 8B:
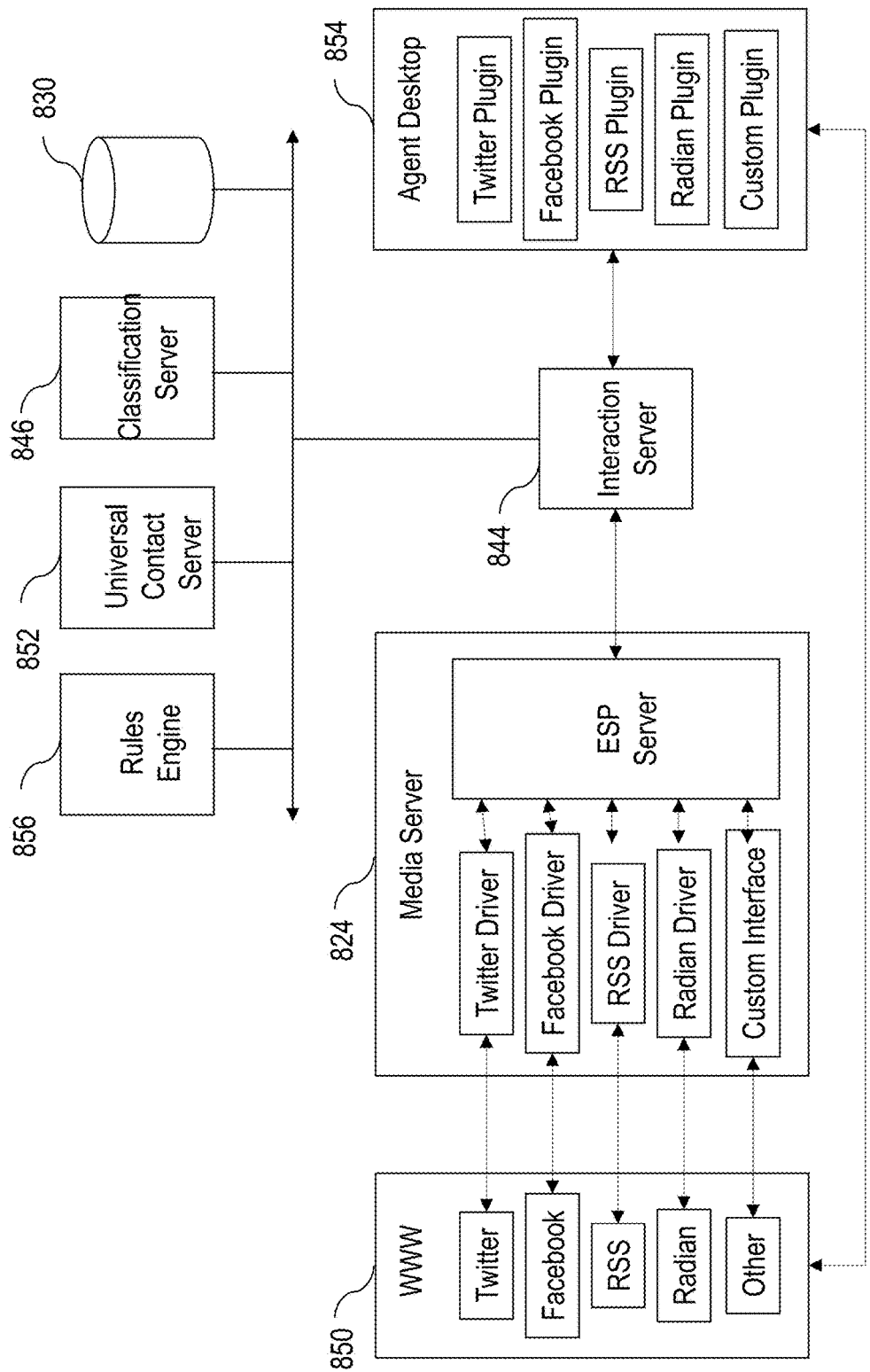
FIG. 8B is a more detailed schematic block diagram of certain components of the system that implements contact center applications using process artifacts.

FIG. 8B is a more detailed schematic block diagram of certain components of the system 800 that implements contact center applications using process artifacts. As shown, the media server 824 is configured to interface with social media platforms 850 such as Twitter, Facebook, RSS, and Radian6, over the communications network 14, to bring interactions into the contact center system. The media server 824 may include pluggable media channel drivers, such as, for example, a Twitter driver and Facebook driver that connect the media server 824 to Twitter and Facebook, respectively. Other channel drivers may include RSS drivers, Radian6 drivers, or any other custom interface for connecting to any type of social site. The channel drivers may be implemented using process artifacts downloaded from a marketplace of artifacts, e.g., the marketplace of FIG. 2B. These process artifacts may be developed by different content providers and/or developers. The process artifacts may implement functionality for interfacing with social media application programming interfaces (APIs) provided by different social media platforms. A channel driver submits data from a media source to the business process (or strategy) that is executed by the interaction server 844 and processes the requests that it receives from the strategy. Communication between the channel drivers and the interaction server 844 may be facilitated, for example, by an external service protocol (ESP) server.

Based on the information received from supported social media APIs, the media server 824 creates an interaction and delivers the interaction along with any associated data to the interaction server 844. In some implementations, all or portions of the interaction are stored in the mass storage device 830 via a universal contact server (UCS) 852. The UCS 852 may be configured to maintain and provide customer contact profiles, including customer contact information (e.g. names, addresses, phone numbers), contact history (previous interactions with the different contacts), and other data used in processing interactions, such as standard responses and screening rules.

In some implementations, the interaction server 844 acts as central hub for managing and processing interactions according to one or more business processes. The business processes may employ a classification server 846 to classify the interaction and determine the post's sentiment and actionability as well as the influence and value of the author. These data points provide a basis for prioritizing the interaction. The value rating of the author could be added by accessing the company's customer database or customer relationship management (CRM) model. CRM is implemented for managing a company's interactions with customers, clients, and sales prospects. It involves organizing, automating, and synchronizing business processes such as, sales, marketing, customer service, and technical support activities, with the goal of maintaining and expanding the current pool of clients. When the business process run by the interaction server determines that an agent response should be provided, the interaction may be either delivered or queued for delivery to an agent.

In some implementations, the contact center system includes a rules engine 856 configured to apply one or more business rules based on input data, and provide a result in response. The rules may be invoked, for example, for assigning a priority to an interaction based on data associated with the interaction. The rules may be configured to consider, for example, actionability, sentiment, influence, and the like, and output a priority value as a result of applying the rule.

In some implementations, the agent devices 838 invoked to engage in social media interactions with customers may each include an agent desktop 854 having a monitor and one or more input devices (e.g. keyboard and mouse). The agent desktop 854 may be configured with various plugins (e.g. a Twitter plugin, a Facebook plugin, a RSS plugin, a Radian6 plugin, or the like) and may provide the agent with graphical user interface (GUI) tools for handling social media tasks. These tools may, for example, provide the agent the ability to send and receive private and public messages, access an author's original post or comment from the agent's browser pane, delete spam or objectionable content, enter disposition codes to assign a business outcome to the agent's actions, and the like. Once a reply is sent by the agent it may be processed by the business process/strategy employed by the interaction server 844, and delivered back to the media server 824 for delivery to the customer through the social media site's API.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, comprising:
transmitting, by a processor, a signal to a communication device associated with a contact center for displaying a plurality of modules for generating an interaction flow of a communication between a customer device and a contact center resource, wherein the interaction flow comprises a plurality of discrete stages in a predetermined order defining ordered steps to be executed in an interaction and is configured to control one or more resources of the contact center for processing inbound and outbound communications, the one or more resources of the contact center comprising a switch coupled between the customer device and the contact center resource;
receiving, by the processor, an indication of a selection of a first module of the plurality of modules to include in the interaction flow;
receiving, by the processor, a modification to a parameter of the first module of the plurality of modules;
identifying, by the processor, a second module of the plurality of modules based on the selection of the first module and the modification to the parameter of the first module;
recommending, by the processor, the second module to be included in the interaction flow by transmitting signal to the communication device associated with the contact center for displaying the second module;
receiving, by the processor, a signal indicating a selection of a third module of the plurality of modules to be included in the interaction flow instead of the second module;
generating, by the processor, the interaction flow based on the first module including the modification to the parameter and the third module, without the second module being included in the interaction flow; and
transmitting, by the processor, a signal to the switch to route the communication to the contact center resource according to the interaction flow.

2. The method of claim 1, wherein the one or more modules comprises instructions for identifying a contact center agent who last serviced a customer.

3. The method of claim 1, further comprising transmitting, by the processor, a signal to the communication device associated with the contact center to display the parameter of the one or more modules.

4. The method of claim 1, further comprising identifying, by the processor, the second module based on contextual data corresponding to the first module selected to be included in the interaction flow.

5. The method of claim 1, further comprising identifying, by the processor, the second module based on user feedback for the second module.

6. The method of claim 4, wherein the contextual data comprises design criteria for the interaction flow.

7. The method of claim 4, wherein the contextual data comprises usage data of the second module.

8. The method of claim 1, further comprising:
receiving, by the processor, a search query based on contextual data representing one or more design criteria of the interaction flow; and
identifying, by the processor, the second module based on the search query.

9. The method of claim 1, further comprising transmitting, by the processor, a signal to the communication device associated with the contact center to display a user interface for enabling configuration of the parameter of the one or more modules.

10. The method of claim 1, wherein the one or more modules comprises instructions for identifying a list of most recent interactions for a customer.

11. A system, comprising:
a switch configured to receive a plurality of communications for routing to one or more communication devices;
a processor coupled to the switch; and
a memory coupled to the processor, wherein the memory stores instructions that, when executed by the processor, cause the processor to:
transmit a signal to a communication device associated with a contact center for displaying a plurality of modules for generating an interaction flow of a communication between a customer device and a contact center resource via the switch, wherein the interaction flow comprises a plurality of discrete stages in a predetermined order defining ordered steps to be executed in an interaction and is configured to control one or more resources of the contact center for processing inbound and outbound communications, the one or more resources of the contact center comprising the switch;
receive an indication of a selection of a first module of the plurality of modules to include in the interaction flow;
receive a modification to a parameter of the first module of the plurality of modules;
identify a second module of the plurality of modules based on the selection of the first module and the modification to the parameter of the first module;
recommend the second module to be included in the interaction flow by transmitting a signal to the communication device associated with the contact center for displaying the second module;
receive a signal indicating a selection of a third module of the plurality of modules to be included in the interaction flow instead of the second module;
generate the interaction flow based on the first module including the modification to the parameter, and the third module, without the second module being included in the interaction flow; and
transmit a signal to the switch to route the communication to the contact center resource according to the interaction flow.

12. The system of claim 11, wherein the one or more modules comprises instructions for identifying a contact center agent who last serviced a customer.

13. The system of claim 11, wherein the instructions further cause the processor to transmit a signal to the communication device associated with the contact center to display the parameter of the one or more modules.

14. The system of claim 11, wherein the instructions further cause the processor to identify the second module based on contextual data corresponding to the first module selected to be included in the interaction flow.

15. The system of claim 11, wherein the instructions further cause the processor to identify the second module based on user feedback for the second module.

16. The system of claim 14, wherein the contextual data comprises design criteria for the interaction flow.

17. The system of claim 14, herein the contextual data comprises usage data of the second module.

18. The system of claim 11, wherein the instructions further cause the processor to:
    receive a search query based on contextual data representing one or more design criteria of the interaction flow; and
    identify the second module based on the search query.

19. The system of claim 11, wherein the instructions further cause the processor to transmit a signal to the communication device associated with the contact center to display a user interface for enabling configuration of the parameter of the one or more modules.

20. The system of claim 11, wherein the one or more modules comprises instructions for identifying a list of most recent interactions for a customer.

* * * * *